(12) United States Patent
Woan et al.

(10) Patent No.: US 12,375,367 B2
(45) Date of Patent: *Jul. 29, 2025

(54) CONFIGURATION OF EVPN TOPOLOGIES USING A USER INTERFACE

(71) Applicant: Juniper Networks, Inc., Sunnyvale, CA (US)

(72) Inventors: Jason Sun Woan, Playa Vista, CA (US); Abhiram Madhugiri Shamsundar, San Jose, CA (US); Bo-Chieh Yang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,766

(22) Filed: Nov. 27, 2023

(65) Prior Publication Data

US 2024/0205102 A1    Jun. 20, 2024

Related U.S. Application Data

(63) Continuation of application No. 17/932,980, filed on Sep. 16, 2022, now Pat. No. 11,831,519, which is a
(Continued)

(51) Int. Cl.
*H04L 41/22*    (2022.01)
*H04L 12/46*    (2006.01)
*H04L 41/12*    (2022.01)

(52) U.S. Cl.
CPC .......... *H04L 41/22* (2013.01); *H04L 12/4641* (2013.01); *H04L 41/12* (2013.01)

(58) Field of Classification Search
CPC ....... H04L 41/0866–0869; H04L 41/22; H04L 12/4641–4695; H04L 41/08–0897
See application file for complete search history.

(56) References Cited

U.S. PATENT DOCUMENTS 6,223,218 B1   4/2001  Iijima et al.
7,450,505 B2 *  11/2008  Buchanan ............... H04L 41/22
                                                           370/231
(Continued)

FOREIGN PATENT DOCUMENTS

CN    108512739 B    2/2021
CN    113452551 A    9/2021

OTHER PUBLICATIONS

Sajassi, A., et al. "RFC 7209: Requirements for Ethernet VPN (EVPN)." (2014).*

(Continued)

*Primary Examiner* — Brendan Y Higa
(74) *Attorney, Agent, or Firm* — Shumaker & Sieffert, P.A.

(57) ABSTRACT

Techniques are described by which a network management system (NMS) provides a common user interface (UI) to enable a user to collectively configure network devices to establish an EVPN topology. For example, an NMS is configured to: generate data representative of a common UI comprising UI elements representing a plurality of network devices to be configured in an EVPN topology; receive, via the common UI, an indication of a user input selecting one or more of the UI elements representing selected network devices; generate UI elements representing a plurality of ports of the selected network devices; receive, via the common UI, an indication of a user input selecting the UI elements representing one or more selected ports; and generate, based on the one or more selected network devices and one or more selected ports, topology relationship information of the one or more selected devices to establish the EVPN topology.

19 Claims, 28 Drawing Sheets

Related U.S. Application Data continuation of application No. 17/644,979, filed on Dec. 17, 2021, now Pat. No. 11,451,449.

(60) Provisional application No. 63/243,491, filed on Sep. 13, 2021.

(56) References Cited

U.S. PATENT DOCUMENTS

| | | | |
|---|---|---|---|
| 8,892,696 | B1 | 11/2014 | Thai |
| 9,729,439 | B2 | 8/2017 | MeLampy et al. |
| 9,729,682 | B2 | 8/2017 | Kumar et al. |
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,985,883 | B2 | 5/2018 | MeLampy et al. |
| 10,142,239 | B2 | 11/2018 | Nagarajan et al. |
| 10,200,264 | B2 | 2/2019 | Menon et al. |
| 10,205,638 | B1* | 2/2019 | Angrish ................ H04L 41/40 |
| 10,277,506 | B2 | 4/2019 | Timmons et al. |
| 10,432,522 | B2 | 10/2019 | Kaplan et al. |
| 10,708,125 | B1* | 7/2020 | Chen ................ H04L 65/1046 |
| 10,797,987 | B1 | 10/2020 | Beacham |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 11,115,272 | B1* | 9/2021 | Kumar ................ H04L 41/22 |
| 11,323,326 | B2* | 5/2022 | Kommula ............. H04L 41/145 |
| 11,451,449 | B1 | 9/2022 | Woan et al. |
| 11,743,151 | B2 | 8/2023 | Safavi |
| 11,831,519 | B2 | 11/2023 | Woan et al. |
| 12,010,004 | B2* | 6/2024 | Gao ................ H04L 12/4641 |
| 2002/0186664 | A1* | 12/2002 | Gibson .................... H04L 9/40 370/254 |
| 2005/0091361 | A1* | 4/2005 | Bernstein ................ H04L 41/22 709/224 |
| 2006/0184998 | A1* | 8/2006 | Smith ................ H04L 41/0253 726/3 |
| 2007/0199066 | A1* | 8/2007 | Smith ................... H04L 41/082 726/15 |
| 2009/0328192 | A1* | 12/2009 | Yang ....................... H04L 63/20 715/810 |
| 2014/0201642 | A1 | 7/2014 | Vicat-Blanc |
| 2015/0256413 | A1 | 9/2015 | Du et al. |
| 2016/0191314 | A1 | 6/2016 | Russell et al. |
| 2016/0301577 | A1 | 10/2016 | Lane |
| 2018/0077047 | A1 | 3/2018 | Srinivasan et al. |
| 2018/0183663 | A1 | 6/2018 | Teeter et al. |
| 2019/0104091 | A1* | 4/2019 | Hooda ................ H04L 12/4641 |
| 2019/0199597 | A1* | 6/2019 | Valisammagari ..... H04L 41/145 |
| 2020/0067812 | A1* | 2/2020 | Malhotra ................ H04L 45/66 |
| 2020/0280495 | A1* | 9/2020 | Sarbin ................ H04L 41/0806 |
| 2020/0396181 | A1 | 12/2020 | Lochhead et al. |
| 2020/0403890 | A1 | 12/2020 | McCulley et al. |
| 2021/0226848 | A1* | 7/2021 | Kommula ............... H04L 41/40 |
| 2021/0306201 | A1 | 9/2021 | Wang et al. |

OTHER PUBLICATIONS

Extended Search Report from counterpart European Application No. 22194654.4 dated Dec. 23, 2022, 10 pp.

George, Dr A. Shaj I, and AS Hovan George. "A Brief Overview of VXLAN EVPN." Ijireeiceinternational Journal of Innovative Research in Electrical, Electronics, Instrumentation and Control Engineering 9.7 (2021): 1-12.

Notice of Allowance from U.S. Appl. No. 17/644,979, dated May 26, 2022, 9 pp.

Prosecution History from U.S. Appl. No. 17/932,980, now issued U.S. Pat. No. 11,831,519, dated Dec. 5, 2022 through Oct. 25, 2023, 26 pp.

Response to Extended Search Report dated Dec. 23, 2022, from counterpart European Application No. 22194654.4 filed Sep. 13, 2023, 27 pp.

Communication pursuant to Article 94(3) EPC from counterpart European Application No. 22194654.4 dated May 27, 2025, 27 pp.

* cited by examiner

× EVPN CONFIGURATION   1. TOPOLOGY   2. NODES   3. NETWORK SETTINGS   4. PORTS   5. CONFIRM    ← BACK   (CONTINUE →)

CHOOSE EVPN TOPOLOGY
SELECT THE TOPOLOGY YOU WANT TO CONSTRUCT AND CONFIGURE RELATED OPTIONS

TOPOLOGY TYPE
- EVPN MULTIHOMING — COLLAPSED CORE WITH ESI-LAG
- HYBRID — EVPN CORE/DISTRIBUTION WITH ESI-LAG
- IP-CLOS — CAMPUS FABRIC WITH L3 AT THE EDGE

TOPOLOGY SCOPE
- ◉ SINGLE SITE — TOPOLOGY WITH SWITCHES FROM A SINGLE SITE
  [HQ-WEST ▾]
- ○ MULTI SITE — TOPOLOGY WITH SWITCHES DISTRIBUTED ACROSS MULTIPLE SITES
- ○ REPLICATED — SINGLE SITE TOPOLOGY, REPLICATED ACROSS MULTIPLE SITES

OVERLAY SETTINGS
BGP LOCAL AS: 65000

UNDERLAY SETTINGS
AS BASE: 65001
ROUTER ID PREFIX: /24
SUBNET: XXX.XXX.XXX.XX/XX 400
402
404
406
408

FIG. 4A

✗ EVPN CONFIGURATION    1. TOPOLOGY    2. NODES    3. NETWORK SETTINGS    4. PORTS    5. CONFIRM    ← BACK  (CONTINUE →)

SELECT EVPN NODES
SELECT THE SWITCHES THAT WILL BE USED IN EACH LAYER OF THE TOPOLOGY AND PROVIDE ROUTER IDS AS REQUIRED

*REQUIRED

COLLAPSED CORE

| | | | | | | CORE-1 ✕ |
|---|---|---|---|---|---|---|
| | | | | | | MAC ADDRESS AC:78:D1:96:D1:E0 |
| | | 422 ⟶ | ⊡ CORE-1 | ⊡ CORE-2 | ⊡ CORE-3 | MODEL EX4650-48Y |
| | | | | | CORE-4 SELECT SWITCHES | STATUS CONNECTED |
| | | | | | | SITE PRIMARY SITE |

ACCESS
426 ⟶ [FILTER 🔍]

| | | STATUS | MAC ADDRESS | SERIAL | ROUTER ID | MODEL |
|---|---|---|---|---|---|---|
| 424A | ☑ ⊡ | CORE-2 | C8:FE:6A:D3:66:00 | XH3120280722 | [172.16.0.12] CANCEL | EX4650-48Y |
| 424B | ☐ ⊡ | ACCESS:SW-3△ | C0:BF:A7:01:46:94 | YYYYYYYYYY | | EX4400-24T |
| 424C | ☐ ⊡ | ACCESS:SW-1△ | AC:78:D1:99:B4:A0 | PF3120480034 | | EX4300-24P |
| 424D | ☐ ⊡ | CORE-4 △ | F0:7C:C7:D3:D4:93 | XA3620080531 | 172.16.0.14 | EX4300-48MP |
| 424E | ☐ ⊡ | ACCESS:SW-2△ | FC:96:43:BB:6A:CB | HV3620440014 | | EX2300-C-12P |
| 424F | ☐ ⊡ | CORE-1 △ | AC:78:D1:96:D1:E0 | XH3120480150 | 172.16.0.11 | EX4650-48Y |
| 424G | ☐ ⊡ | CORE-3 △ | C8:FE:6A:D3:7F:00 | XH3120280540 | 172.16.0.13 | EX4650-48Y |

428 ⟶

SELECT 1    CANCEL

IP CONFIGURATIONS
V33 (33)    33.1.1.2
V30 (40)    40.1.1.2

ROUTER ID
[172.16.0.11]

REMOVE FROM TOPOLOGY

X EVPN CONFIGURATION    1. TOPOLOGY   2. NODES   3. NETWORK SETTINGS   4. PORTS   5. CONFIRM    ← BACK   CONTINUE →

SELECT EVPN NODES
SELECT THE SWITCHES THAT WILL BE USED IN EACH LAYER OF THE TOPOLOGY AND PROVIDE ROUTER IDS AS REQUIRED

*REQUIRED

COLLAPSED CORE

CORE-1   CORE-3   CORE-4   SELECT SWITCHES

ACCESS

ACCESS-SW-1   ACCESS-SW-3   SELECT SWITCHES

| FILTER 🔍 | 432 | | | | |
|---|---|---|---|---|---|
| STATUS | | MAC ADDRESS | SERIAL | ROUTER ID | MODEL |
| ☐ ⛓ CORE-2 | | C8:FE:6A:D3:66:00 | XH3120280722 | 172.16.0.12 | EX4650-48Y |
| ☐ ⛓ ACCESS:SW-3 ⚠ | | C0:BF:A7:01:46:94 | YYYYYYYYYY | | EX4400-24T |
| ☐ ⛓ A̶C̶ | SWITCH IS ALREADY | :99:B4:A0 | PF3120430034 | | EX4300-24P |
| ☐ ⛓ C̶O̶ | CONFIGURED | :D3:D4:93 | XR3620080531 | 172.16.0.14 | EX4300-48MP |
| ☐ ⛓ ACCESS:SW-2 | | FC:96:43:BB:6A:CB | HV3620440014 | | EX2300-C-12P |
| ☐ ⛓ CORE-1 ⚠ | | AC:78:D196:D1:E0 | XH3120480150 | 172.16.0.11 | EX4650-48Y |
| ☐ ⛓ CORE-3 ⚠ | | C8:FE:6A:D3:7F:00 | XH3120280540 | 172.16.0.13 | EX4650-48Y |

434A, 434B, 434C

CANCEL

× EVPN CONFIGURATION  1. TOPOLOGY  2. NODES  3. NETWORK SETTINGS  4. PORTS  5. CONFIRM     ← BACK  (CONTINUE →)

CONFIGURE NETWORKS
DEFINE NETWORKS, ROUTING OPTIONS, AND PORT CONFIGURATIONS

450 ↗
455 ↗
453 ↗
452 ↗
451 ↗

NETWORKS

| EDIT NETWORKS | ✓ × |
|---|---|
| NAME | V30 |
| VLAN ID | 40 |
| | (1 - 4094 OR ((SITEVAR))) |
| SUBNET | 40.1.0/24 |
| GATEWAY | 40.1.1.1 |

VRF

VIRTUAL ROUTING AND FORWARDING
◉ ENABLED  ○ DISABLED

MY-VRF-INSTANCE  1 NETWORK  ⟩
VRF30  1 NETWORK  ⟩

ADD VRF ENTRY

OTHER IP CONFIGURATION

NETWORK-SPECIFIC IP
CONFIGURATION FOR EACH
COLLAPSED CORE SWITCH

| EDIT V30 | ✓ × |
|---|---|
| ○ DHCP  ◉ STATIC | |
| IP ADDRESS | 40.1.1.2 |
| SUBNET | 255.255.255.0 |

CORE / ACCESS PORT CONFIGURATION

PORT CONFIGURATION FOR ESI-LAG BETWEEN
COLLAPSED CORE AND ACCESS SWITCHES
NAME
MY-PROFILE

TRUNK NETWORKS
× V30(40)  × V33(33)  +

SHOW ADVANCED ▽

PORT ENABLED
◉ ENABLED  ○ DISABLED

MODE
◉ TRUNK  ○ ACCESS
PORT NETWORK (UNTAGGED/NATIVE VLAN)
NONE  ⟩

SPEED
AUTO  ⟩

DUPLEX
AUTO  ⟩

MAC LIMIT
0
(0-16383, 0 => UNLIMITED)
POE
○ ENABLED  ◉ DISABLED
STP EDGE
○ YES  ◉ NO

X EVPN CONFIGURATION    1. TOPOLOGY   2. NODES   3. NETWORK SETTINGS   4. PORTS   5. CONFIRM

← BACK    (CONTINUE →)

PORTS
SELECT SWITCH PORTS FOR EVPN AND ESI-LAG CONNECTIONS
SELECT PORTS FOR 2 CORE AND 23 ACCESS SWITCHES

CORE SWITCHES

| SWITCH | SIZE | MODEL | LINKS TO DISTRIBUTION |
|---|---|---|---|
| SW-0003 | CAMPUS-WEST | EX-4650 | 0/4 |
| SW-0004 | CAMPUS-WEST | EX-4650 | 2/4 |

DISTRIBUTION SWITCHES
EX-2300

| SWITCH | SIZE | MODEL | LINKS TO CORE | LINKS TO ACCESS |
|---|---|---|---|---|
| SW-0003 | CAMPUS-WEST | EX-2300 | 2/2 | 2/6 |
| SW-0004 | CAMPUS-WEST | EX-2300 | 0/2 | 0/6 |
| SW-0005 | CAMPUS-WEST | EX-2300 | 0/2 | 0/6 |
| SW-0006 | CAMPUS-WEST | EX-2300 | 0/2 | 0/6 |

(EDIT PORTS FOR ALL EX-2300)

LINK TO: (CORE SWITCH) (ACCESS SWITCH)

ACCESS SWITCHES
EX-2300

EDIT PORTS FOR ALL EX-2300

| SWITCH | SITE | MODEL | LINKS TO DISTRIBUTION | AE INDEX |
|---|---|---|---|---|
| SW-0003 | CAMPUS-WEST | EX-2300 | 2/3 | 0 |
| SW-0004 | CAMPUS-WEST | EX-2300 | 0/3 | 1 |
| SW-0005 | CAMPUS-WEST | EX-2300 | 0/3 | 2 |

EX-4650

EDIT PORTS FOR ALL EX-4650

| SWITCH | SITE | MODEL | LINKS TO DISTRIBUTION | AE INDEX |
|---|---|---|---|---|
| SW-1005 | CAMPUS-WEST | EX-4650 | 0/3 | 3 |
| SW-0285 | FACILITY-0002 | EX-4650 | 0/3 | 4 |
| SW-0286 | FACILITY-0002 | EX-4650 | 0/3 | 5 |

CONFIGURATION OF EVPN TOPOLOGIES USING A USER INTERFACE

This application is a continuation of U.S. patent application Ser. No. 17/932,980, filed 16 Sep. 2022, which is a continuation of U.S. patent application Ser. No. 17/644,979, filed 17 Dec. 2021, which claims the benefit of U.S. Provisional Patent Application No. 63/243,491, filed 13 Sep. 2021, the entire content of each application is incorporated herein by reference.

TECHNICAL FIELD

The disclosure relates generally to computer networks and, more specifically, to network configuration using a user interface.

BACKGROUND

A computer network is a collection of interconnected computing devices that can exchange data and share resources. Example network devices include switches or other layer two ("L2") devices that operate within the second layer of the Open Systems Interconnection ("OSI") reference model, i.e., the data link layer, and routers or other layer three ("L3") devices that operate within the third layer of the OSI reference model, i.e., the network layer. Network devices within computer networks often include a control unit that provides control plane functionality for the network device and forwarding units for routing or switching data units.

Network devices may each participate in an L2 virtual private network (L2VPN") service, such as an Ethernet Virtual Private Network (EVPN). An EVPN may be used to extend two or more L2 customer networks (e.g., customer networks located in different geographical areas or different racks of a data center) through an intermediate L3 network (usually referred to as a "provider network" or "core network"), in a transparent manner, i.e., as if the intermediate L3 network does not exist. In particular, the EVPN transports L2 communications, such as Ethernet packets or "frames," between customer networks via traffic engineered label switched paths ("LSP") through the intermediate network in accordance with one or more multiprotocol label switching (MPLS) protocols.

EVPN supports multihoming in which a customer edge device ("access device") is coupled to two or more provider edge devices ("core devices") on the same EVPN instance to provide redundancy, load balancing, or both. An access device is said to be multihomed when it is coupled to two or more core devices on the same EVPN instance when the core devices are resident on the same Ethernet segment (e.g., set of Ethernet links). The core devices on the Ethernet segment provide transport services through the intermediate network to a remote core device, and each of the core devices on the Ethernet segment may forward Ethernet frames in the Ethernet segment for the access device.

In some examples, an IP-CLOS network (e.g., multi-stage network) may provide scalability for an EVPN fabric. Each network device of an IP-CLOS topology resides in a defined layer of the network. For example, an IP-CLOS topology comprises a core layer including network devices that provide layer 3 functionality, a distribution layer including network devices that provide an aggregation point for the access layer to connect to the core layer, and an access layer including network devices that provide customer devices with connectivity to the IP fabric. In some examples, the core layer and distribution layer are "collapsed" into a single layer in which a network device may implement core layer functions and distribution layer functions and is referred to as a "collapsed core network."

SUMMARY

In general, this disclosure describes techniques by which a network management system provides a common user interface to enable a user to collectively configure network devices to establish an EVPN topology. In EVPN, network devices may be configured in various network topologies. In some examples, network devices may be configured in an EVPN multihoming topology in which an access device is coupled to two or more core devices on the same EVPN instance when the core devices are resident on the same physical Ethernet segment. In some examples, network devices may be configured in an IP-CLOS topology in which each network device of the IP-CLOS topology resides in a defined layer of the network (e.g., core layer, distribution layer, and access layer). Typically, each of the network devices of an EVPN topology is separately configured to establish the EVPN topology. For example, each of the network devices of the EVPN topology is separately configured with an aggregated Ethernet interface associated with ports of the network device for an EVPN multihoming topology or configured with the appropriate uplink and/or downlink connections for the IP-CLOS topology. The EVPN topologies may also be segmented using virtual local area networks (VLANs) and virtual routing and forwarding (VRF) instances. In these examples, each of the network devices is separately configured with VLANs and VRFs associated with ports of the network device. The separate configuration of network devices typically requires manually mapping ports of each of the network devices (e.g., to belong to the same aggregated Ethernet bundle for an EVPN multihoming topology or to configure the uplink and/or downlink connections of an IP-CLOS topology), which may be a time-consuming and/or error-prone process.

In accordance with the techniques described in this disclosure, a network management system (NMS) that manages a plurality of network devices, generates data representative of a common user interface (UI) to enable a user to collectively configure network devices to establish an EVPN topology, such as an EVPN multihoming topology, IP-CLOS topology, etc.

The techniques of the disclosure may provide one or more technical advantages and practical applications. For example, by providing a common user interface by which a user may collectively configure network devices to establish an EVPN topology, a user may simply establish the EVPN topology through user inputs to the common user interface to select UI elements representing network devices and ports of the network devices to establish the EVPN topology. The network management system may use the information specified by the user input to the common user interface to automatically map the ports of the network devices and generate topology relationship information needed to configure the network devices to establish the EVPN topology. In this way, the user is no longer required to configure each of the network devices separately, which may be a time-consuming and/or error-prone process that requires manual mapping of ports.

In one example, the disclosure is directed to a network management system comprising: one or more processors; and a memory comprising instructions that when executed by the one or more processors cause the one or more processors to: generate data representative of a common user interface (UI) for display on a display device, the data representative of the common UI comprising UI elements representing a plurality of network devices to be configured in an Ethernet Virtual Private Network (EVPN) topology, the UI elements for each of the plurality of network devices to be configured in the EVPN topology generated for display on the common UI; receive, via the common UI on the display device, an indication of a user input selecting one or more of the UI elements representing selected network devices of the plurality of network devices to establish the EVPN topology; generate UI elements representing a plurality of ports of the selected network devices to establish the EVPN topology; receive, via the common UI on the display device, an indication of a user input selecting the UI elements representing selected ports of the selected network devices to establish the EVPN topology; and generate, based on the selected network devices and selected ports of the selected network devices, topology relationship information of the selected devices to establish the EVPN topology.

In another example, the disclosure is directed to a network management system comprising: one or more processors; and a memory comprising instructions that when executed by the one or more processors cause the one or more processors to: generate data representative of a common user interface (UI) for display on a display device, the data representative of the common UI comprising UI elements representing a plurality of network devices to be configured in an Ethernet Virtual Private Network (EVPN) multihoming topology, the UI elements for each of the plurality of network devices to be configured in the EVPN multihoming topology generated for display on the common UI; receive, via the common UI on the display device, an indication of a user input selecting one or more of the UI elements representing a selected access device and two or more core devices of the plurality of network devices to establish the EVPN multihoming topology; generate UI elements representing a plurality of ports of the selected access device and two or more core devices to establish the EVPN multihoming topology; receive, via the common UI on the display device, an indication of a user input selecting the UI elements representing one or more selected ports of the selected access device and two or more core devices to establish the EVPN multihoming topology; and generate, based on the selected access device and two or more core device and the one or more selected ports of the selected access device and two or more core devices, topology relationship information of the selected access device and two or more core devices to establish the EVPN multihoming topology.

In another example, the disclosure is directed to a network management system comprising: one or more processors; and a memory comprising instructions that when executed by the one or more processors cause the one or more processors to: generate data representative of a common user interface (UI) for display on a display device, the data representative of the common UI comprising UI elements representing a plurality of network devices of an IP-CLOS network to be configured in an IP-CLOS topology, the UI elements for each of the plurality of network devices to be configured in the IP-CLOS topology generated for display on the common UI; receive, via the common UI on the display device, an indication of a user input selecting one or more of the UI elements representing selected access devices, distribution devices, and core devices of the plurality of network devices to establish the IP-CLOS topology; generate UI elements representing a plurality of ports of the selected access devices, distribution devices, and core devices to establish the IP-CLOS topology; receive, via the common UI on the display device, an indication of a user input selecting the UI elements representing one or more selected ports of the selected access devices, distribution devices, and core devices to establish the IP-CLOS topology; and generate, based on the selected access devices, distribution devices, and core devices and the one or more selected ports of the access devices, distribution devices, and core devices, topology relationship information of the selected access devices, distribution devices, and core devices to establish the IP-CLOS topology.

In another example, the disclosure is directed to a method including generating, by one or more processors of a network management system, data representative of a common user interface (UI) for display on a display device, the data representative of the common UI comprising UI elements representing a plurality of network devices to be configured in an Ethernet Virtual Private Network (EVPN) topology, the UI elements for each of the plurality of network devices to be configured in the EVPN topology generated for display on the common UI; receiving, via the common UI on the display device, an indication of a user input selecting one or more of the UI elements representing one or more selected network devices of the plurality of network devices to establish the EVPN topology; generating, by the network management system, UI elements representing a plurality of ports of the one or more selected network devices to establish the EVPN topology; receiving, via the common UI on the display device, an indication of a user input selecting the UI elements representing one or more selected ports of the one or more selected network devices to establish the EVPN topology; and generating, by the network management system and based on the one or more selected network devices and one or more selected ports of the one or more selected network devices, topology relationship information of the one or more selected devices to establish the EVPN topology.

In another example, the disclosure is directed to a non-transitory computer-readable storage medium comprising instructions that, when executed, configure processing circuitry to: generate data representative of a common user interface (UI) for display on a display device, the data representative of the common UI comprising UI elements representing a plurality of network devices to be configured in an Ethernet Virtual Private Network (EVPN) topology, the UI elements for each of the plurality of network devices to be configured in the EVPN topology generated for display on the common UI; receive, via the common UI on the display device, an indication of a user input selecting one or more of the UI elements representing selected network devices of the plurality of network devices to establish the EVPN topology; generate UI elements representing a plurality of ports of the selected network devices to establish the EVPN topology; receive, via the common UI on the display device, an indication of a user input selecting the UI elements representing selected ports of the selected network devices to establish the EVPN topology; and generate, based on the selected network devices and selected ports of the selected network devices, topology relationship information of the selected devices to establish the EVPN topology.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 4A-4M illustrate examples of user interfaces by which a user may collectively configure network devices to establish an EVPN multihoming topology, in accordance with the techniques described in this disclosure.

FIGS. 5A-5F illustrate examples of user interfaces by which a user may collectively configure network devices to establish an IP-CLOS topology, in accordance with the techniques described in this disclosure.

FIG. 6 illustrates an example list of port connections of EVPN topologies resulting from the configuration using the common user interface, in accordance with the techniques described in this disclosure.

DETAILED DESCRIPTION

Figure 1A:
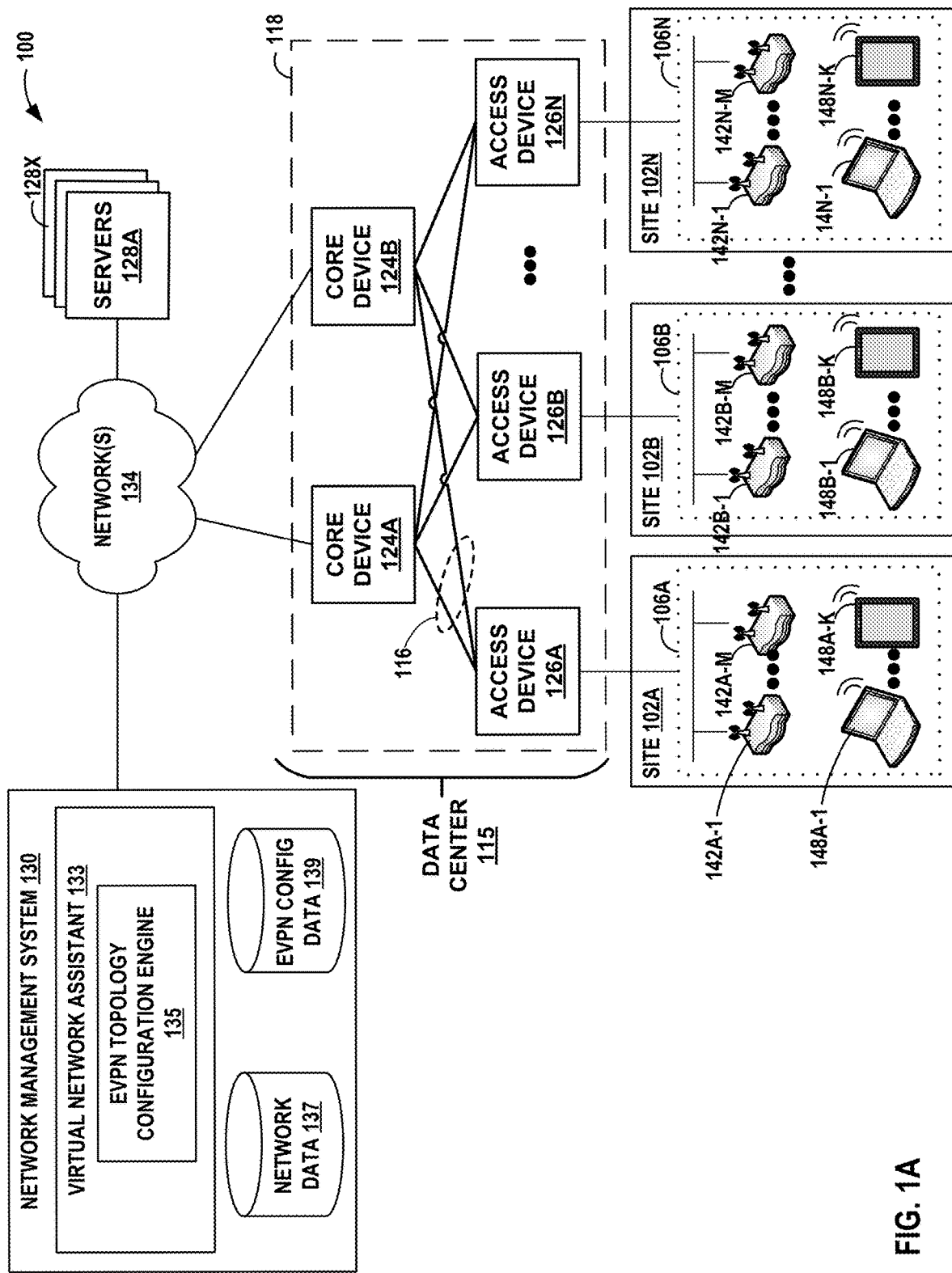
FIG. 1A is a block diagram of an example network system providing a common user interface to enable a user to collectively configure network devices to establish an EVPN multihoming topology, in accordance with one or more techniques of the disclosure.

FIG. 1A is a diagram of an example network system 100 providing a common user interface to enable a user to collectively configure network devices to establish an EVPN multihoming topology. Example network system 100 includes a plurality sites 102A-102N at which a network service provider manages one or more wireless networks, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as enterprises, offices, campuses, hospitals, airports, stadiums, or retail outlets, often install complex network systems, including a network of wireless access point (AP) devices, e.g., AP devices 142, throughout the premises to provide wireless network services to one or more wireless client devices. In this example, site 102A includes a plurality of AP devices 142A-1 through 142A-M. Each AP device 142 may be any type of wireless access point, including, but not limited to, a commercial or enterprise access point, a router, or any other device capable of providing wireless network access.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-K are currently located at site 102A. Similarly, a plurality of UEs 148B-1 through 148B-K are currently located at site 102B, and a plurality of UEs 148N-1 through 248N-K are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, a plurality of servers 128A-128X (collectively, "servers 128"), such as web servers, databases servers, file servers, and the like, and a network management system (NMS) 130. Other examples of servers may include Authentication, Authorization and Accounting (AAA) server for authenticating users and/or UEs 148, a Dynamic Host Configuration Protocol (DHCP) server for dynamically assigning network addresses (e.g., IP addresses) to UEs 148 upon authentication, a Domain Name System (DNS) server for resolving domain names into network addresses, or other servers providing one or more network services.

As shown in FIG. 1A, the various devices and systems of network 100 are coupled together via one or more network(s) 134, e.g., the Internet and/or an enterprise intranet. Each one of the servers 128, AP devices 142, UEs 148, NMS 130, and any other servers or devices attached to or forming part of network system 100 may include a system log or an error log module wherein each one of these devices records the status of the device including normal operational status and error conditions.

Figure 1B:
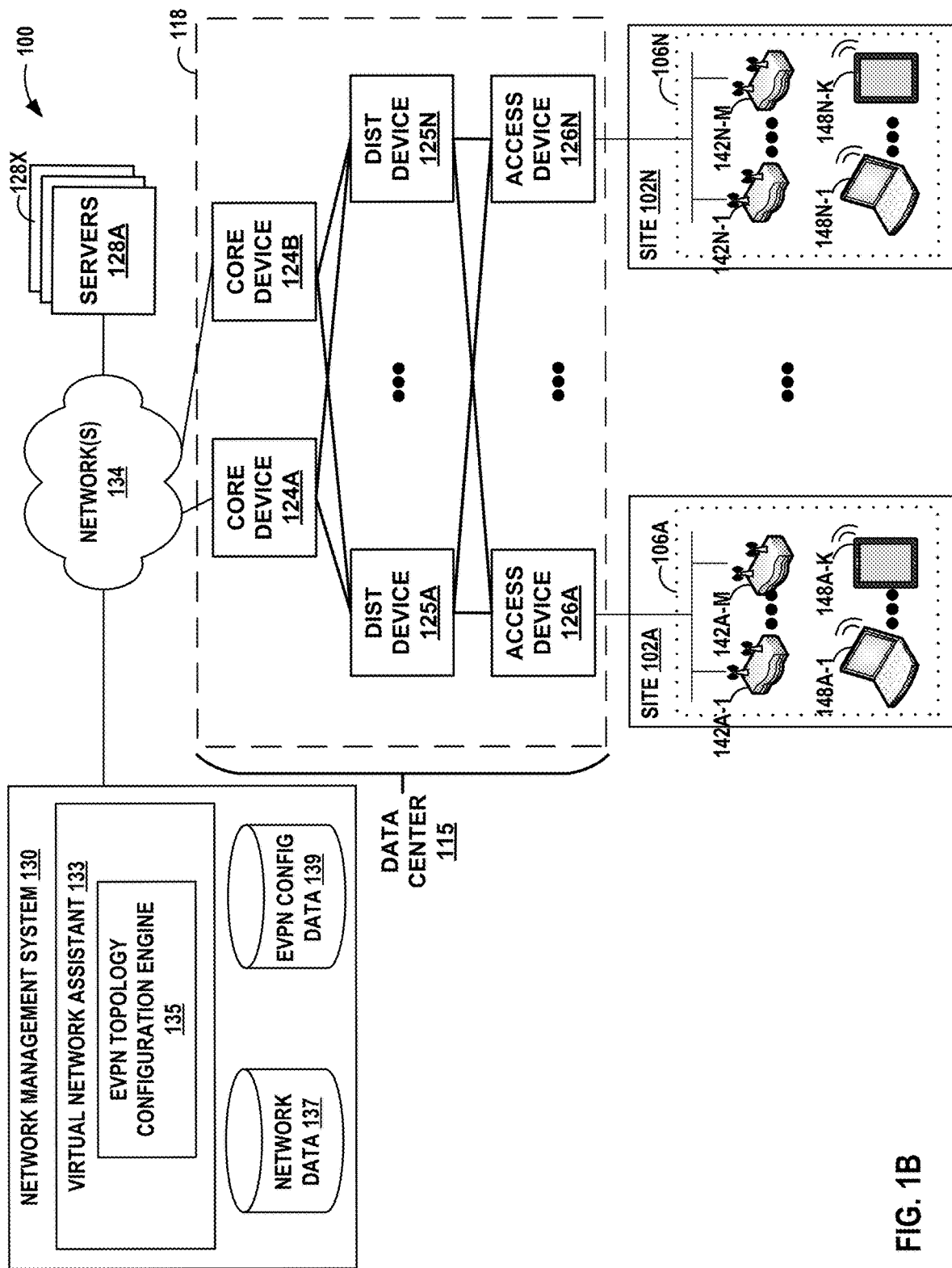
FIG. 1B is a block diagram of an example network system providing a common user interface to enable a user to collectively configure network devices to establish an IP-CLOS topology, in accordance with one or more techniques of the disclosure.

In the example of FIG. 1A, network system 100 may include a data center 115 comprising an Internet Protocol (IP) fabric 118 that provides UEs 148 with connectivity to the IP fabric and networks 134. In some examples, IP fabric 118 may include a multi-staged network in which each network device (e.g., switch) resides in a defined layer of the network, such as a two-tier layered model (as shown in FIG. 1A) or three-tier layered model (as shown in FIG. 1B), referred to as a CLOS topology or a spine and leaf network, or a hybrid of the two models. Typically, a three-tier layered model (e.g., IP-CLOS network) comprises a core layer including network devices that provide layer 3 functionality to provide access to servers 128 via networks 134, a distribution layer including network devices that provide an aggregation point for the access layer to connect to the core layer, and an access layer including network devices that provide UEs 148 with connectivity to the IP fabric 118. In a two-tier layered model ("collapsed IP fabric" or "collapsed core network"), the core layer and distribution layer are "collapsed" into a single layer in which a network device may implement core layer functions and distribution layer functions.

As shown in the example of FIG. 1A, IP fabric 118 may represent a collapsed core network in which core devices 124A and 124B (collectively, "core devices 124") reside in the combined core and distribution layer, and access devices 126A-126N (collectively, "access devices 126") reside in the access layer. IP fabric 118 of FIG. 1A is also referred to herein as "collapsed core network 118."

Core devices 124 and access devices 126 may each participate in an L2 virtual private network (L2VPN") service, such as an Ethernet Virtual Private Network (EVPN). An EVPN is a service that provides a form of L2 connectivity across an intermediate L3 network, e.g., networks 134, to interconnect two or more L2 networks that may be networks for geographically or logically separated sites of an enterprise (or campus) or may represent networks for different customers of the intermediate network (e.g., networks 134) (or tenants of a data center network). Often, EVPN is transparent to the customer networks in that these customer networks are not aware of the intervening intermediate network and instead act and operate as if these customer networks were directly connected to form a single L2 network. In a way, EVPN enables a form of transparent local area network ("LAN") connection between two customer networks that each operates an L2 network and may also be referred to as a "transparent LAN service."

In some examples, network devices of IP fabric 118 may implement virtual LANs (VLANs) and virtual routing and forwarding (VRF) routing instances to provide logical separation of the network across shared links within a shared device. For example, site 102A may include employees and guests in which traffic from the employees needs to be isolated from traffic from the guests. Core devices 124 and access devices 126 may be included in one or more VLANs, which are groups of devices on one or more LANs that are configured to communicate as if they were attached to the same wire. VLANs are used to create separate virtual networks (VNs) in layer 2 (e.g., such as respective virtual networks for guests and employees) while VRFs are used to create different routing table instances to isolate IP traffic for the separate virtual networks.

In some examples, network system 100 may deploy IP fabric 118 with a layer 3 IP-based underlay network with EVPN-VXLAN as the overlay. With EVPN-VXLAN, logical layer 2 networks may be created across a layer 3 underlay network.

In the example of FIG. 1A, NMS 130 is a cloud-based computing platform that manages network devices of network system 100. As further described herein, NMS 130 provides an integrated suite of network management tools and implements various techniques of the disclosure. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 monitors network data associated with network devices in network system 100. In some examples, NMS 130 monitors network data associated with wireless networks 106A-106N at each site 102A-102N, respectively, to deliver a high-quality wireless network experience to end users, IoT devices and clients at the site. In some examples, NMS 130 obtains network data associated with network devices in IP fabric 118 to configure the network devices to establish network topologies, such as an EVPN multihoming topology, an IP-CLOS topology, or other EVPN topologies. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, alert generation, and network topology establishment.

In some examples, NMS 130 observes, collects and/or receives network data 137 for a variety of devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 154 may be collected and/or measured by other devices in the network system 100. In some examples, NMS 130 observes, collects and/or receives network data 137 for network devices, such as routers, switches, and/or other network devices in IP fabric 118, such as core devices 124 and access devices 126 (in a collapsed core network of FIG. 1A) or core devices 124, distribution devices 125, and access devices 126 (in an IP-CLOS network of FIG. 1B). In these examples, network data 137 may include the model type, connection status, MAC address, serial identifier, or other information about network devices in IP fabric 118.

NMS 130 may include a virtual network assistant (VNA) 133 that analyzes network data received from one or more network devices in network system 100, provides real-time insights and simplified troubleshooting for IT operations, automatically takes remedial action or provides recommendations to proactively address network issues, and/or provides configuration of the one or more network devices for establishing various network topologies. VNA 133 may, for example, include a network data processing platform configured to process hundreds or thousands of concurrent streams of network data from UEs 148, sensors and/or agents associated with AP devices 142, nodes within network 134, and/or network devices within IP fabric 118. For example, VNA 133 of NMS 130 may include a network performance engine that automatically determines one or more service level experience (SLE) metrics for each client device 148 in a wireless network 106 and/or network device in IP fabric 118. SLE metrics determined based on the collected network data can be used to measure various aspects of network performance. SLE metrics seek to measure and understand network performance from the viewpoint of the end user experience on the network. One example SLE metric is a coverage metric, which tracks the number of user minutes that a client device's received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. In some examples, SLE metrics may include performance metrics, such as bandwidth, latency, jitter, or other metrics to measure the performance of network topologies established within IP fabric 118. The thresholds may be customized and configured by the network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to identify the root cause of error conditions or poor network performance metrics detected or predicted from the streams of event data. VNA 133 may generate a notification indicative of the root cause and/or one or more remedial actions that may be taken to address the root cause of the error conditions or poor network performance metrics. In some examples, if the root cause may be automatically resolved, VNA 133 invokes one or more remedial or mitigating actions to address the root cause of the error condition or poor network performance metrics, thus automatically improving the underlying network performance metrics (e.g., one or more SLE metrics) and also automatically improving the user experience of the network.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In an EVPN configuration, an access device is said to be multihomed when it is coupled to two or more physically different core devices on the same EVPN instance when the core devices are resident on the same Ethernet segment. As shown in FIG. 1A, access device 126A may be multihomed to core devices 124A and 124B by Ethernet segment 116 for redundancy, load balancing, or both. The set of Ethernet links connecting access device 126A to the multihomed core devices 124A and 124B constitutes an Ethernet segment that may appear as a single logical interface (IFL) associated with a Link Aggregation Group (LAG) (also referred to as an "aggregated Ethernet bundle" or "ESI-LAG") to the access device. That is, a set of physical links belonging to the same Ethernet segment, e.g., Ethernet segment 116, may be configured to be treated as a single aggregated Ethernet interface. In the example of FIG. 1A, ports of core devices 124A and 124B that interface with the Ethernet links to access device 126A are configured as logically bundled Ethernet segment 116 such that core devices 124A and 124B operate to provide multihomed connectivity to access device 126A of data center 115.

Typically, each of the devices of a multihomed topology is separately configured to establish the EVPN multihoming topology. For example, each of the core devices of the multihomed topology is separately configured with an aggregated Ethernet interface, including an Ethernet segment identifier (ESI), mapped to a physical interface (e.g., port) of the core device to connect to the access device, any virtual local area networks (VLANs), and/or other network configurations (e.g., DHCP, static), etc. Similarly, the access device of the multihomed topology is separately configured with uplink interfaces to each of the core devices of the multihomed topology with the same aggregated Ethernet interface, any VLANs, and/or other network configurations.

In accordance with the techniques described in this disclosure, NMS 130 may include an EVPN topology configuration engine 135 that provides a common user interface to enable a user to collectively configure network devices to establish an EVPN multihoming topology. In the example of FIG. 1A, EVPN topology configuration engine 135 may provide a common user interface to enable a user to collectively configure at least one access device 126 (e.g., access device 126A) and two or more core devices 124 (e.g., core devices 124A and 124B) to establish an EVPN multihoming topology.

As one example, NMS 130 may obtain network data 137 associated with network devices within IP fabric 118 with which to establish an EVPN multihoming topology. In this example, NMS 130 may obtain network data associated with core devices 124 and access devices 126 within IP fabric 118, the network data including, for example, MAC address, serial number, model type, status (e.g., connected, not connected), site location, etc., of the network devices. For example, NMS 130 may include an interface, such as an application programming interface (API) to obtain network data associated with the network devices within IP fabric 118.

As further described in FIGS. 4A-4M below, EVPN topology configuration engine 135 may use network data 137 associated with core devices 124 and access devices 126 to generate data representative of a common UI, the data representative of the common UI including UI elements representing access devices 126 and core devices 124, ports of access devices 126 and core devices 124, and various network configuration settings to establish an EVPN multihoming topology within collapsed core network 118. In this example, EVPN topology configuration engine 135 may receive, via the common user interface on a display device, an indication of a user input selecting UI elements representing access device 126A and core devices 124A and 124B, an indication of a user input selecting UI elements representing selected ports of access device 126A and core devices 124A and 124B, and an indication of a user input selecting UI elements representing network configuration settings for the EVPN multihoming topology.

EVPN topology configuration engine 135 of NMS 130 may then receive, via the user interface on the display device, an indication of a user input to apply the configurations, which causes NMS 130 to generate topology relationship information of the EVPN multihoming topology. As further described below, EVPN topology configuration engine 135 may execute API requests (e.g., PUT or POST requests) to update or create one or more API resources specifying the topology relationship information of the EVPN multihoming topology. NMS 130 may push the one or more API resources to a controller or orchestrator, which may use the API resources to generate configuration data to configure core devices 124 and access device 126A to establish the EVPN multihoming topology. In some examples, EVPN topology configuration engine 135 may export a list of port connections based on the topology relationship information (e.g., as a comma-separated value (CSV) file or other type of file) such that a user may use the list of port connections to wire the connections between core devices 124 and access device 126A to establish the EVPN multihoming topology.

In some examples, EVPN topology configuration engine 135 may validate whether a network device and/or port connection may be used to establish the EVPN multihoming topology. For example, EVPN topology configuration engine 135 may determine whether a network device is already selected as a network device in the EVPN multihoming topology, in use by an organization EVPN, not supported for establishing the EVPN multihoming topology (e.g., incompatible models or protocols), or otherwise unusable for the EVPN multihoming topology. In some examples, EVPN topology configuration engine 135 may validate the configuration of the EVPN multihoming topology. For example, EVPN topology configuration engine 135 may determine whether the port connections, aggregated Ethernet interface configurations, or other configurations for the EVPN multihoming topology are valid. In these examples, EVPN topology configuration engine 135 may generate data representative of UI elements representing a notification (e.g., message) and/or indication (e.g., warning icon) that the network device and/or port connection is unusable for the EVPN multihoming topology, disable the UI element representing the network device and/or port connections from being selected for the EVPN multihoming topology, and/or disable the UI element representing the selection to apply the configurations to the network devices from being selected.

FIG. 1B is a block diagram of an example network system providing a common user interface to collectively configure network devices to establish an IP-CLOS topology, in accordance with one or more techniques of the disclosure. Network system 100 of FIG. 1B is similar to network system 100 FIG. 1A except as described below.

In the example of FIG. 1B, IP fabric 118 may include a multi-staged network in which each network device (e.g., switch) resides in a defined layer of the network, such as a three-tier layered model. In this example, IP fabric 118 may represent a non-collapsed core network in which core devices 124A and 124B (collectively, "core devices 124") reside in the core layer that provide layer 3 functionality to provide access to servers 128 via networks 134, distribution devices 125A-125N (collectively, "distribution devices 125") reside in the distribution layer that provide an aggregation point for the access layer to connect to the core layer, and access devices 126A-126N (collectively, "access devices 126") reside in the access layer that provide UEs 148 with connectivity to the IP fabric 118. IP fabric 118 for FIG. 1B may be referred to herein as "IP-CLOS network 118."

Typically, each of the devices of an IP-CLOS network, e.g., IP-CLOS network 118, is separately configured to establish the IP-CLOS network. For example, each of the core devices 124 of the IP-CLOS network is configured with one or more interfaces for the core device, a loopback interface and router identifier (e.g., IP address), enable per-packet load balancing, and underlay network settings (e.g., BGP underlay network settings). Each of the distribution devices 125 of the IP-CLOS network is configured with interconnect interfaces between core devices 124 and the connectivity to distribution devices 125, a loopback interface and router identifier, enable per-packet load balancing, and underlay network settings. Each of the access devices 126 of the IP-CLOS network is configured with interfaces that connect to distribution devices 125, configure a virtual chassis with non-stop routing and bridging for high-availability, and underlay network settings.

In accordance with the techniques described in this disclosure, NMS 130 may include an EVPN topology configuration engine 135 that provides a common user interface to enable a user to collectively configure network devices to establish an IP-CLOS topology. In the example of FIG. 1B, EVPN topology configuration engine 135 may provide a common user interface to enable a user to configure core devices 124, distribution devices 125, and access devices 126 to establish an IP-CLOS topology.

As one example, NMS 130 may obtain network data 137 associated with network devices within IP fabric 118 with which to establish an IP-CLOS topology. In this example, NMS 130 may obtain network data associated with core devices 124, distribution devices 125, and access devices 126 within IP fabric 118, including the MAC address, serial number, model type, status (e.g., connected, not connected), site locations, etc., of the network devices. For example, NMS 130 may include an interface, such as an API to obtain network data pertaining to network devices within IP fabric 118.

As further described in FIGS. 5A-5F below, EVPN topology configuration engine 135 may use network data 137 associated with core devices 124, distribution devices 125, and access devices 126 to generate data representative of a common UI, the data representative of the common UI including UI elements representing core devices 124, distribution devices 125, and access devices 126, ports of core devices 124, ports of distribution devices 125, ports of access devices 126, and various network configurations to establish an IP-CLOS topology. In this example, EVPN topology configuration engine 135 may receive, via the common user interface on a display device, an indication of a user input selecting UI elements representing core devices 124, distribution devices 125, and access devices 126, an indication of a user input selecting UI elements representing selected ports of core devices 124, distribution devices 125, and access devices 126, and an indication of a user input selecting UI elements representing network configuration settings for the IP-CLOS topology.

EVPN topology configuration engine 135 of NMS 130 may then receive, via the user interface on the display device, an indication of a user input to apply the configurations, which causes NMS 130 to generate topology relationship information of the IP-CLOS topology. As further described below, EVPN topology configuration engine 135 may execute API requests (e.g., PUT or POST requests) to update or create one or more API resources specifying the topology relationship information of the IP-CLOS topology. NMS 130 may push the one or more API resources to a controller or orchestrator, which may use the API resources to generate configuration data to configure core devices 124, distribution devices 125, and access device 126 to establish the IP-CLOS topology. In some examples, EVPN topology configuration engine 135 may export a list of port connections based on the topology relationship information (e.g., as a comma-separated value (CSV) file or other type of file) such that a user may use the list of port connections to wire the connections between core devices 124, distribution devices 125, and access device 126 to establish the IP-CLOS topology.

In some examples, EVPN topology configuration engine 135 may validate whether a network device and/or port connection may be used to establish the IP-CLOS topology. For example, EVPN topology configuration engine 135 may determine whether a network device is already selected as a network device of the IP-CLOS topology, in use by an organization EVPN, not supported for establishing the IP-CLOS topology (e.g., incompatible models or protocols), or otherwise unusable for the IP-CLOS topology. In some examples, EVPN topology configuration engine 135 may validate the configuration of the IP-CLOS topology. For example, EVPN topology configuration engine 135 may determine whether the port connections or other configurations for the IP-CLOS topology are valid. In these examples, EVPN topology configuration engine 135 may generate data representative of UI elements representing a notification (e.g., message) and/or indication (e.g., warning icon) that the network device and/or port connection is unusable for the IP-CLOS topology, disable the UI element representing the network device and/or port connections from being selected for the IP-CLOS topology, and/or disable the UI element representing the selection to apply the configurations to the network devices from being selected.

Figure 1C:
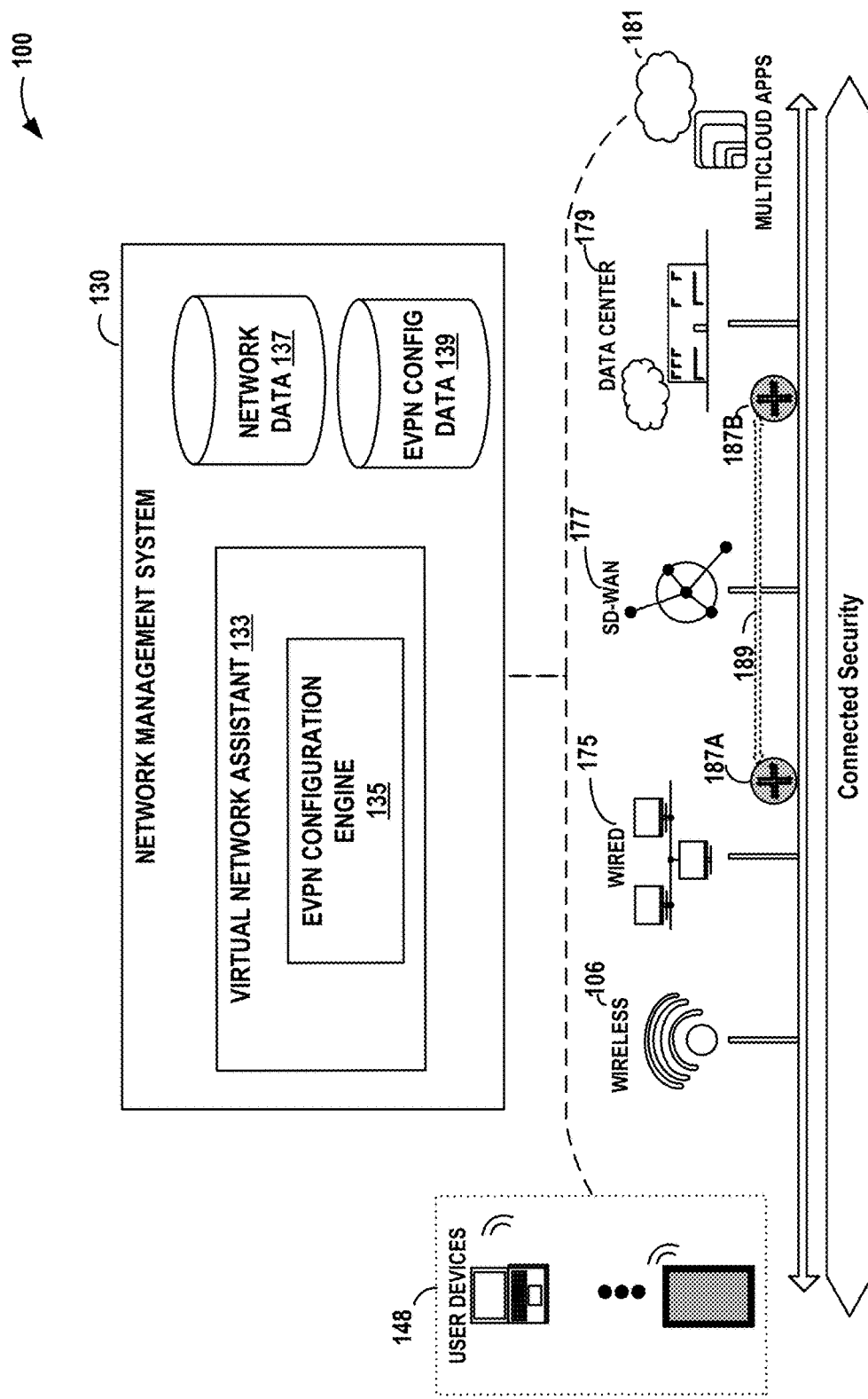
FIG. 1C is a block diagram illustrating further example details of the network system of FIGS. 1A and 1B.

FIG. 1C is a block diagram illustrating further example details of the network system of FIG. 1A or FIG. 1B. In this example, FIG. 1C illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 175 networks at the network edge (far left of FIG. 1C) to cloud-based application services 181 hosted by computing resources within data centers 179 (far right of FIG. 1C).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, alert generation, and/or network topology establishment. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1C, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable user interface-based configuration and management of network system 100 for configuring and managing devices associated with wireless networks 106, wired LAN networks 175, and/or SD-WAN 177. For example, a user may select UI elements to express a desired configuration of network components without specifying an exact native device configuration. By utilizing user interface-based configuration eliminates the need to define exact device configuration syntax to achieve the configuration. By utilizing user interface-based configuration, a user and/or user system is relieved of the burden of determining the exact device configurations required to achieve a desired result of the network topology. For example, it is often difficult and burdensome to specify and manage exact instructions to configure each device of a network topology when various different types of devices perform different functions of the network topology. The types and kinds of devices of the network may dynamically change as new devices are added and device failures occur. Managing various different types of devices with different configuration protocols, syntax, and software versions to configure a cohesive network of devices is often difficult to achieve. Thus, by only requiring a user/system to specify requirements using a user interface-based configuration to collectively configure different types of devices, management and configuration of the network devices becomes more efficient.

Figure 2A:
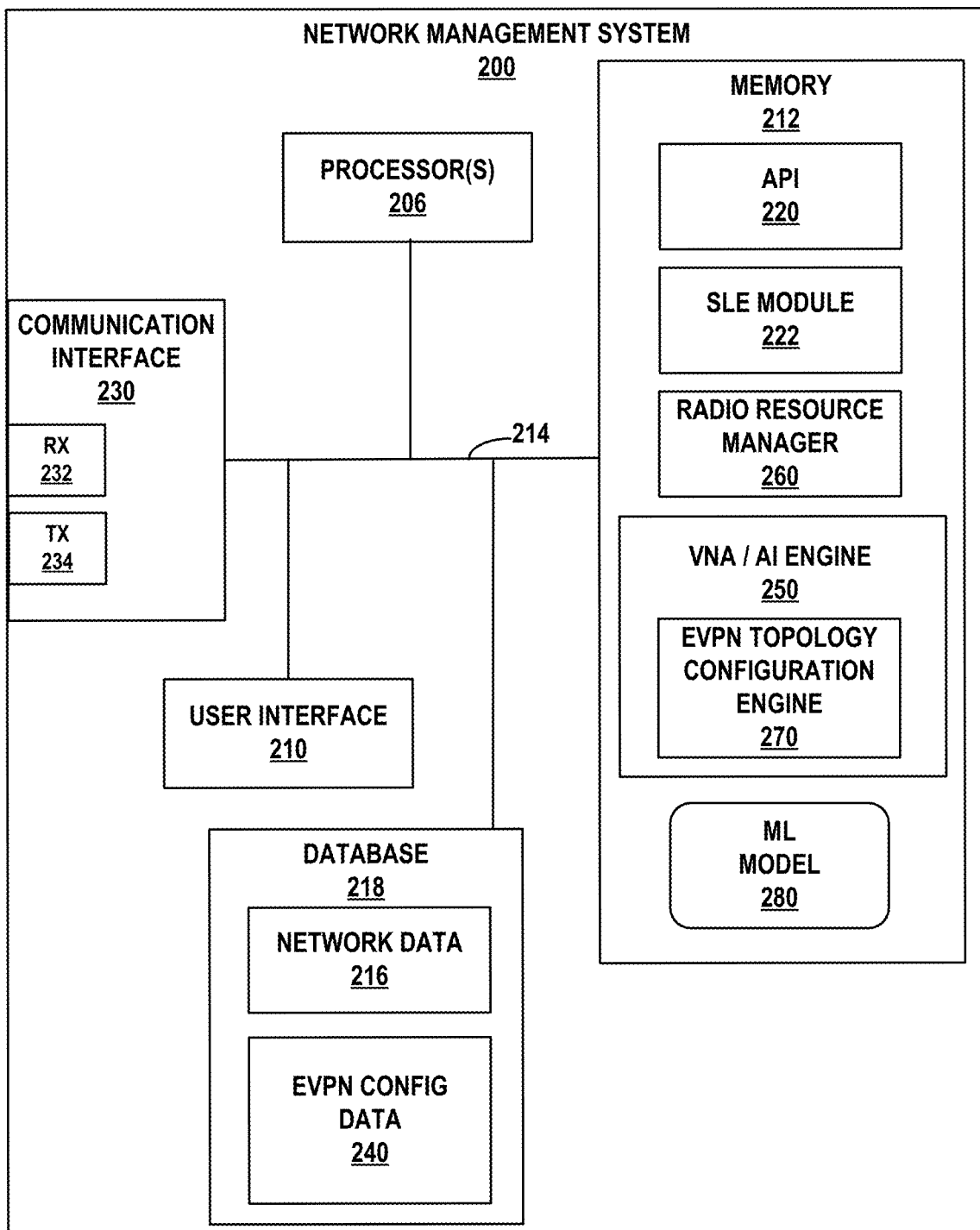
FIGS. 2A and 2B are a block diagrams of an example network management system configured to provide a common user interface to enable a user to collectively configure network devices to establish an EVPN topology, in accordance with one or more techniques of the disclosure.
Figure 2B:
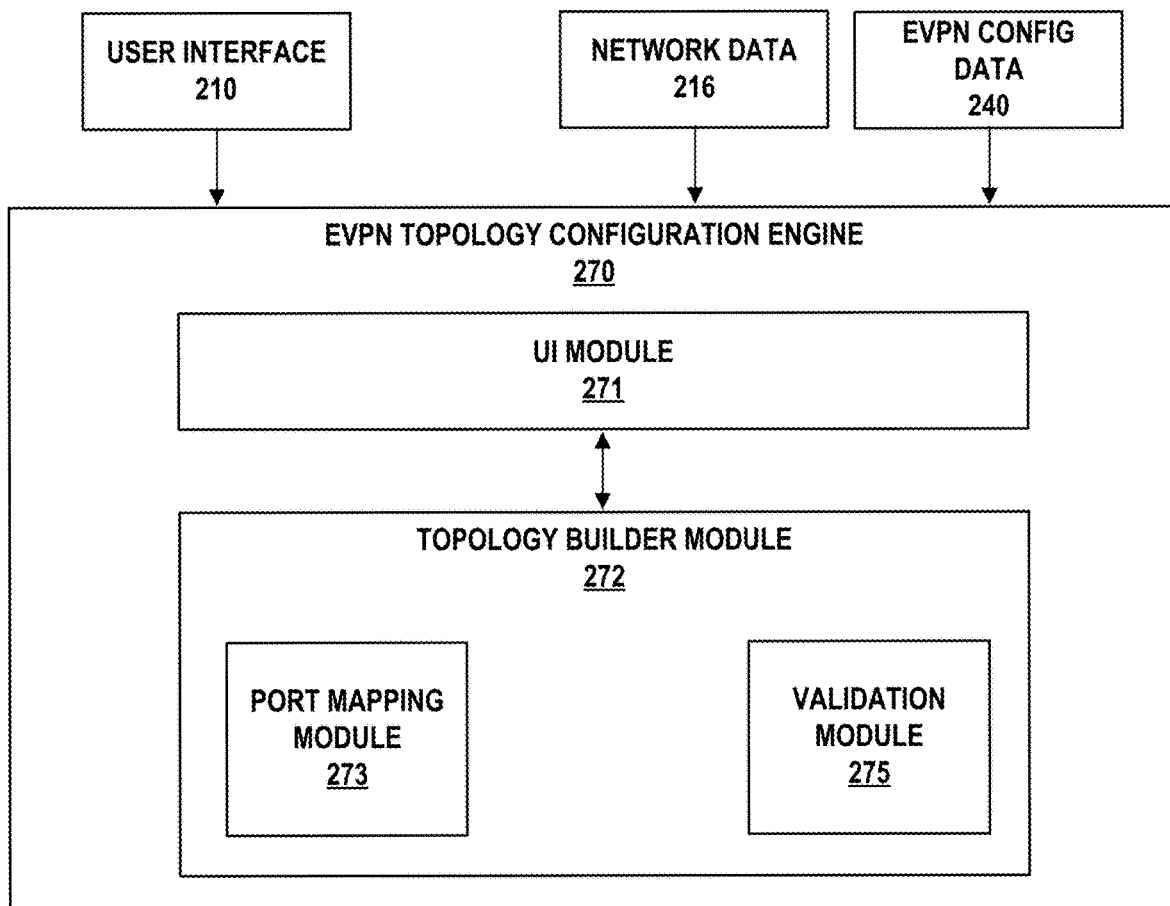

FIGS. 2A and 2B are block diagrams of an example network management system (NMS) 200 configured to provide a common user interface to enable a user to collectively configure network devices to establish an EVPN topology, in accordance with one or more techniques of the disclosure. NMS 200 may be used to implement, for example, NMS 130 in FIG. 1A and/or NMS 130 in FIG. 1B. In such examples, NMS 200 is responsible for configuration and establishment of an EVPN topology, such as an EVPN multihoming topology or IP-CLOS topology, within one or more sites 102. In some examples, NMS 200 obtains network data of network devices of IP fabric network 118, via APIs, and uses this data to generate data representative of a common user interface to enable a user to provide user input to the common user interface to collectively configure the network devices to establish an EVPN topology. In some examples, NMS 200 may be part of another server shown in FIG. 1A or FIG. 1B, or a part of any other server.

NMS 200 includes a communications interface 230, one or more processor(s) 206, a user interface 210, a memory 220, and a database 212. The various elements are coupled together via a bus 214 over which the various elements may exchange data and information.

Processor(s) 206 execute software instructions, such as those used to define a software or computer program, stored to a computer-readable storage medium (such as memory 220), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Communications interface 230 may include, for example, an Ethernet interface. Communications interface 230 couples NMS 200 to a network and/or the Internet, such as any of network(s) 134 as shown in FIG. 1A, and/or any local area networks. Communications interface 230 includes a receiver 232 and a transmitter 234 by which NMS 200 receives/transmits data and information to/from any of AP devices 142, servers 128, core devices 124, distribution devices 125, access devices 126, and/or any other devices or systems forming part of network 100 such as shown in FIG. 1A or FIG. 1B. The data and information received by NMS 200 may include, for example, network data and/or event log data received from network devices within IP fabric 118 used by NMS 200 to remotely configure and establish network topologies within IP fabric 118. NMS may further transmit data via communications interface 230 to any of network devices at any of network sites 102A-102N to remotely configure network topologies for the IP fabric of any of network sites 102A-102N.

Memory 220 includes one or more devices configured to store programming modules and/or data associated with operation of NMS 200. For example, memory 220 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 includes an API 220, SLE module 222, a radio resource management (RRM) engine 260, a virtual network assistant (VNA)/AI engine 250, and a machine learning model 280. NMS 200 may also include any other programmed modules, software engines and/or interfaces configured for remote monitoring and configuration of IP fabric 118, including remote monitoring and configuration of any of network devices within IP fabric 118 (e.g., core devices 124 and access devices 126 of collapsed core network 118 of FIG. 1A or core devices 124, distribution devices 125, and access devices 126 of IP-CLOS network 118).

API 220 may in some cases present a RESTful application programming interface using HTTPS requests to a URL and JavaScript Object Notation (JSON). NMS 200 may use API 220 to fetch information about the network devices (e.g., access devices and core devices, and/or distribution devices), such as the MAC address, serial number, model type, status (e.g., connected, not connected), site locations, etc., of the network devices. The information about the network devices may be stored in database 218 as network data 216. EVPN topology configuration engine 270 may use the information about the network devices to generate data representative of a common user interface, such as generating UI elements representing the network devices, UI elements representing ports of the network devices, and UI elements representing various network configurations for the network devices.

As further described below, API 220 may, based on API requests (e.g., PUT or POST requests) executed by EVPN topology configuration engine 270, create and/or update one or more API resources with topology relationship information specified by user input to the common user interface. NMS 200 may send the one or more API resources to a controller or orchestrator to generate configuration information to configure network devices to establish an EVPN topology such as an EVPN multihoming topology, IP-CLOS topology, etc.

RRM engine 260 monitors one or more metrics for each site 106A-106N in order to learn and optimize the radio-frequency (RF) environment at each site. For example, RRM engine 260 may monitor the coverage and capacity SLE metrics (e.g., managed by SLE module 222) for a wireless network 106 at a site 102 in order to identify potential issues with coverage and/or capacity in the wireless network 106 and to make adjustments to the radio settings of the access points at each site to address the identified issues. RRM engine 260 may determine channel and transmit power distribution across all AP devices 142 in each network 106A-106N. RRM engine 260 may monitor events, power, channel, bandwidth, and number of clients connected to each AP device. RRM engine 260 may measure the strength of a radio signal of client devices, such as an RSSI value. RRM engine 260 may further automatically change or update configurations of one or more AP devices 142 at a site 106 with an aim to improve the coverage and/or capacity SLE metrics and thus to provide an improved wireless experience for the user.

VNA/AI engine 250 analyzes network data received from AP devices 142 as well as its own data to monitor performance of wireless networks 106A-106N. For example, VNA engine 250 may identify when anomalous or abnormal states are encountered in one of wireless networks 106A-106N.

VNA/AI engine 250 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 250 may automatically invoke one or more remedial actions intended to address the identified root cause(s) of one or more poor SLE metrics. Examples of remedial actions that may be automatically invoked by VNA/AI engine 250 may include, but are not limited to, invoking RRM 260 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 250 may proactively and automatically provide a notification including recommended remedial actions to be taken by IT personnel to address the anomalous or abnormal wireless network operation.

SLE module 222 enables set up and tracking of thresholds for one or more SLE metrics for each of wireless networks 106A-106N. SLE module 222 further analyzes network data (e.g., stored as network data 216) collected by AP devices and/or UEs associated with wireless networks 106A-106N, such as any of AP devices 142 from UEs 148 in each wireless network 106A-106N. For example, AP devices 142A-1 through 142A-M collect network data from UEs 148A-1 through 148A-K currently associated with wireless network 106A (e.g., named assets, connected/unconnected WiFi clients). This data, in addition to any network data collected by one or more APs 142A-1 through 142A-M in wireless network 106A, is transmitted to NMS 200 and stored as, for example, network data 216.

NMS 200 executes SLE module 222 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

In accordance with the techniques described in this disclosure, VNA engine 250 includes an EVPN topology configuration engine 270 to provide a common user interface to enable a user to collectively configure network devices to establish an EVPN topology. EVPN topology configuration engine 270 may represent an example implementation of EVPN topology configuration engine 135 of FIG. 1A and/or FIG. 1B. A more detailed view of EVPN topology configuration engine 270 is described and illustrated in FIG. 2B.

In the example of FIG. 2B, EVPN topology configuration engine 270 may include UI module 271 and topology builder module 272. Although UI module 271 is illustrated as included in EVPN topology configuration engine 270, UI module may be a separate module within NMS 200 accessible by EVPN topology configuration engine 270.

EVPN topology configuration engine 270 may cause UI module 271 to generate data representative of a common user interface to enable a user to collectively configure network devices to establish an EVPN topology. As further described in FIGS. 4A-4M below, EVPN topology configuration engine 270 may cause UI module 271 to use network data 216 (obtained via APIs 220) to generate user interface elements such as a selectable list of core devices 124 and access devices 126 within a collapsed core network (e.g., collapsed core network 118 of FIG. 1A), or other user interface elements to enable a user to select core devices 124 and access devices 126 with which to configure and establish an EVPN multihoming topology within the collapsed core network.

For example, EVPN topology configuration engine 270 of NMS 200 may receive, at user interface 210, an indication of a user input selecting UI elements representing core devices 124 and access devices 126 with which to configure and establish an EVPN multihoming topology. In response to receiving the user input selecting UI elements representing core devices 124A and 124B and access device 126A, EVPN topology configuration engine 270 may cause UI module 271 to generate user interface elements representing various network settings for the EVPN multihoming topology, including UI elements to add one or more VLANs, add one or more VRFs, one or more port configurations for an ESI-LAG between core devices and access devices (e.g., VLANs for trunk network), specify aggregated Ethernet indexes, and/or define other IP configurations for the core devices (e.g., DHCP, static configurations).

In response to receiving the user input selecting UI elements representing network settings for core devices 124A and 124B and access device 126A, EVPN topology configuration engine 270 may cause UI module 271 to generate user interface elements representing ports of the selected network devices. The UI module 271 may generate UI elements representing ports of the selected network devices based on the model of the selected network devices.

EVPN topology configuration engine 270 of NMS 200 may receive, via user interface 210, an indication of a user input specifying ports of core devices 124A and 124B and access device 126A to configure the port connections for the EVPN multihoming topology. Topology builder module 272 may include a port mapping module 273 to map selected ports of the network devices. For example, port mapping module 273 may automatically associate selected ports of core devices 124A and 124B and access device 126A to an ESI-LAG and define the port usage (e.g., uplink or downlink).

EVPN topology configuration engine 270 may execute API requests (e.g., PUT or POST requests) to cause API 220 to create and/or update one or more API resources used to establish the EVPN multihoming topology. As described above, the one or more API resources may include topology relationship information specified by the user inputs to the common user interface, such as selected network devices, selected ports of the selected network devices, and network settings. NMS 130 may send the one or more API resources to a controller or orchestrator, which may use the one or more API resources to generate configuration information to configure core devices 124A and 124B and access device 126A to establish the EVPN multihoming topology.

As further described in FIGS. 5A-5F below, EVPN topology configuration engine 270 may alternatively, or additionally, cause UI module 271 to use network data 216 (obtained via APIs 220) to generate user interface elements such as a selectable list of core devices 124, distribution devices 125, and access devices 126 within an IP-CLOS network (e.g., IP-CLOS network 118 of FIG. 1B), or other user interface elements to enable a user to select core devices 124, distribution devices, and access devices 126 with which to configure and establish an IP-CLOS topology.

For example, EVPN topology configuration engine 270 of NMS 200 may receive, at user interface 210, an indication of a user input selecting UI elements representing core devices 124, distribution devices 125, and access devices 126 with which to configure and establish an IP-CLOS topology. In response to receiving the user input selecting UI elements representing core devices 124, distribution devices 125, and access devices 126, EVPN topology configuration engine 270 may cause UI module 271 to generate user interface elements representing various network settings for the IP-CLOS topology, including UI elements to add one or more VLANs, add one or more VRFs, and/or defining other IP configurations for the access devices (e.g., DHCP, static configurations). In some examples in which a hybrid of a collapsed core and non-collapsed core is to be configured, EVPN topology configuration engine 270 may cause UI module 271 to generate user interface elements representing one or more port configurations for core devices and distribution devices (e.g., VLANs for trunk network).

In response to receiving the user input selecting UI elements representing core devices 124, distribution devices 125, and access devices 126, EVPN topology configuration engine 270 may cause UI module 271 to generate user interface elements representing ports of the selected network devices. The UI module 271 may generate UI elements representing ports of the selected network devices based on the model of the selected network devices.

EVPN topology configuration engine 270 of NMS 200 may receive, via user interface 210, an indication of a user input specifying ports of core devices 124, distribution devices 125, and access devices 126 to configure the port connections for the IP-CLOS topology. Topology builder module 272 may include a port mapping module 273 to map selected ports of the network devices. For example, port mapping module 273 may map selected ports of core devices 124 as downlink ports to connect to distribution devices 125, map selected ports of distribution devices 125 as uplink ports to connect to core devices 125, map selected ports of distribution devices 125 as downlink ports to connect to access devices 126, and map selected ports of access devices 126 as uplink ports to connect to distribution devices 125. In some examples, port mapping module 273 may generate IP addresses of the links (e.g., either auto-generated if DHCP or specified by a user if static).

EVPN topology configuration engine 270 may execute API requests (e.g., PUT or POST requests) to cause API 220 to create and/or update one or more API resources used to establish the IP-CLOS topology with information specified by the user inputs to the common user interface. As described above, the one or more API resources may include topology relationship information specified by the user inputs to the common user interface, such as selected network devices, selected ports of the selected network devices, and network settings. NMS 130 may send the one or more API resources to a controller or orchestrator, which may use the one or more API resources to generate configuration information to configure core devices 124, distribution devices 125, and access devices 126 to establish the IP-CLOS topology.

Topology builder module 272 may include a validation module 275 to validate whether a network device may be used to establish an EVPN topology. For example, validation module 275 may perform a lookup of network data 216, EVPN configuration data 240, and/or data within EVPN topology configuration engine 270 to determine whether a network device is already selected as a network device of the EVPN topology, in use by an organization EVPN, not supported for establishing the EVPN topology (e.g., incompatible models or protocols), or otherwise unusable for the EVPN topology. Validation module 275 may, in some examples, be configured to determine whether a model of the network device is a core device, distribution device, and/or access device and/or whether the network device may support the EVPN topology.

In response to determining that a network device is unusable for the EVPN topology, validation module 275 may cause UI module 271 to generate data representative of UI elements representing a notification (e.g., message) and/or indication (e.g., warning icon) that the network device is unusable for the EVPN topology, and/or disabling the UI element representing the network device from being selected for the EVPN topology.

In some examples, validation module 275 may validate whether one or more port connections are usable for the EVPN topology. For example, validation module 275 may perform a lookup of EVPN configuration data 240 or data within EVPN topology configuration engine 270 to determine whether port connections of network devices are already used or otherwise unusable for the EVPN topology. In response to determining that a port connection is unusable for the EVPN topology, validation module 275 may cause UI module 271 to generate data representative of UI elements representing a notification (e.g., message) and/or indication (e.g., warning icon) that the port connection is unusable for the EVPN topology, and/or disabling the UI element representing the port connection from being selected for the EVPN topology.

In some examples, VNA/AI engine 250 analyzes network configuration data received from core devices 124 and access devices 126 to monitor performance of the EVPN topology. For example, VNA engine 250 may identify when anomalous or abnormal states are encountered in the established EVPN topologies. VNA/AI engine 250 may use a root cause analysis module (not shown) to identify the root cause of any anomalous or abnormal states of the EVPN topologies.

In addition, VNA/AI engine 250 may automatically invoke one or more remedial actions intended to address the identified root cause(s) of one or more poor SLE metrics. Examples of remedial actions that may be automatically invoked by VNA/AI engine 250 may include, but are not limited to, invoking the EVPN topology configuration engine 270 to generate a notification of the root cause of one or more poor SLE metrics from the EVPN topologies and other remedial actions.

Figure 3:
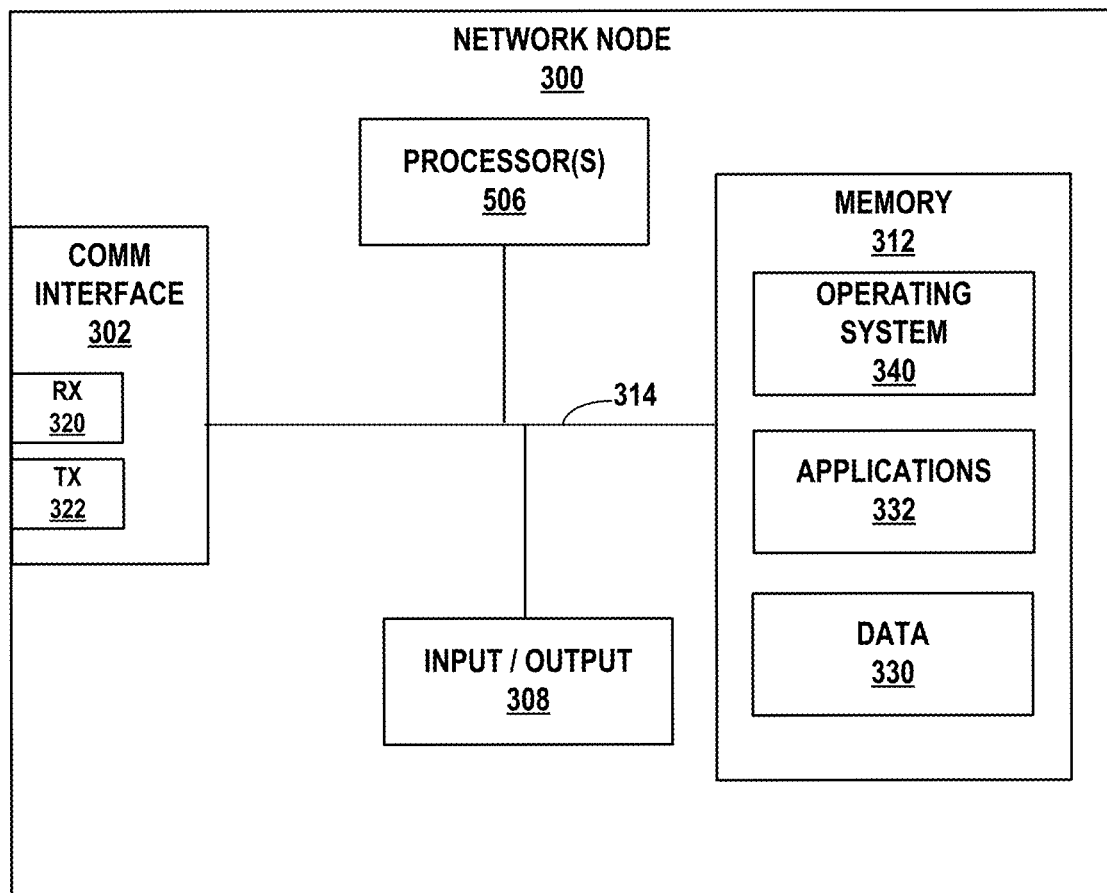
FIG. 3 is a block diagram of an example network node, such as a router or switch, in accordance with one or more techniques of the disclosure.

FIG. 3 is a block diagram illustrating an example network node 300 configured according to the techniques described herein. In one or more examples, the network node 300 implements a device or a server attached to the network 134 of FIG. 1A, e.g., servers 128A-128X, etc., or a network device such as, e.g., core devices 124, access devices 126, or other routers or switches.

In this example, network node 300 includes a communications interface 302, e.g., an Ethernet interface, a processor 306, input/output 308, e.g., display, buttons, keyboard, keypad, touch screen, mouse, etc., a memory 312 and an assembly of components 316, e.g., assembly of hardware module, e.g., assembly of circuits, coupled together via a bus 314 over which the various elements may interchange data and information. Communications interface 302 couples the network node 300 to a network, such as an enterprise or campus network.

Though only one interface is shown by way of example, those skilled in the art should recognize that network nodes may have multiple communication interfaces. Communications interface 302 includes a receiver 320 via which the network node 300 can receive data and information (e.g., including network device related information such as MAC addresses, model types, status (e.g., connected, not connected), site locations, etc.). Communications interface 302 includes a transmitter 322, via which the network node 300 can send data and information (e.g., including configuration information, authentication information, etc.).

Memory 312 stores executable software applications 332, operating system 340 and data/information 330. Data 330 includes system log and/or error log that stores network data for node 300 and/or other devices, based on a logging level according to instructions from the network management system. Network node 300 may, in some examples, forward the network data to a network management system (e.g., NMS 130 of FIG. 1A) for analysis as described herein.

FIGS. 4A-4M illustrate examples of a common user interface by which a user may configure and establish an EVPN multihoming topology, in accordance with the techniques described in this disclosure. The common user interface examples described in FIGS. 4A-4M are described with respect to EVPN topology configuration engine 135 of FIG. 1A and EVPN topology configuration engine 270 of FIGS. 2A-2B. Although FIGS. 4A-4M are described with respect to an EVPN topology configuration engine generating data representative of the common user interfaces, the techniques may also be described with respect to a UI module (e.g., UI module 271 of FIG. 2B) generating data representative of the common user interfaces.

In the example of FIG. 4A, EVPN topology configuration engine 270 may generate data representative of a common user interface 400 including user interface elements representing the type of EVPN topology to configure and establish, such as an EVPN multihoming topology 402, topology scope 404, overlay settings 406, and underlay settings 408. The UI elements representing the topology scope 404 may include an option to select the configuring and establishing of an EVPN multihoming topology with network devices from a single site ("Single Site"), with network devices distributed across a plurality of sites ("Multi Site"), or replicating an EVPN topology of a single site across a plurality of sites ("Replicated").

EVPN topology configuration engine 270 may generate data representative of an input field to enable a user to specify overlay settings 406 and underlay settings 408 of the EVPN multihoming topology. For example, common user interface 400 may include an input field to enable a user to specify overlay settings 406 such as an Autonomous System (AS) identifier of the network in which the EVPN multihoming topology is to be established, such as an AS used with Border Gateway Protocol (BGP) (e.g., BGP Local AS). Common user interface 400 may include an input field to enable a user to specify underlay settings 408 such as an Autonomous System base, a router ID prefix, and a subnet.

Figure 4B:
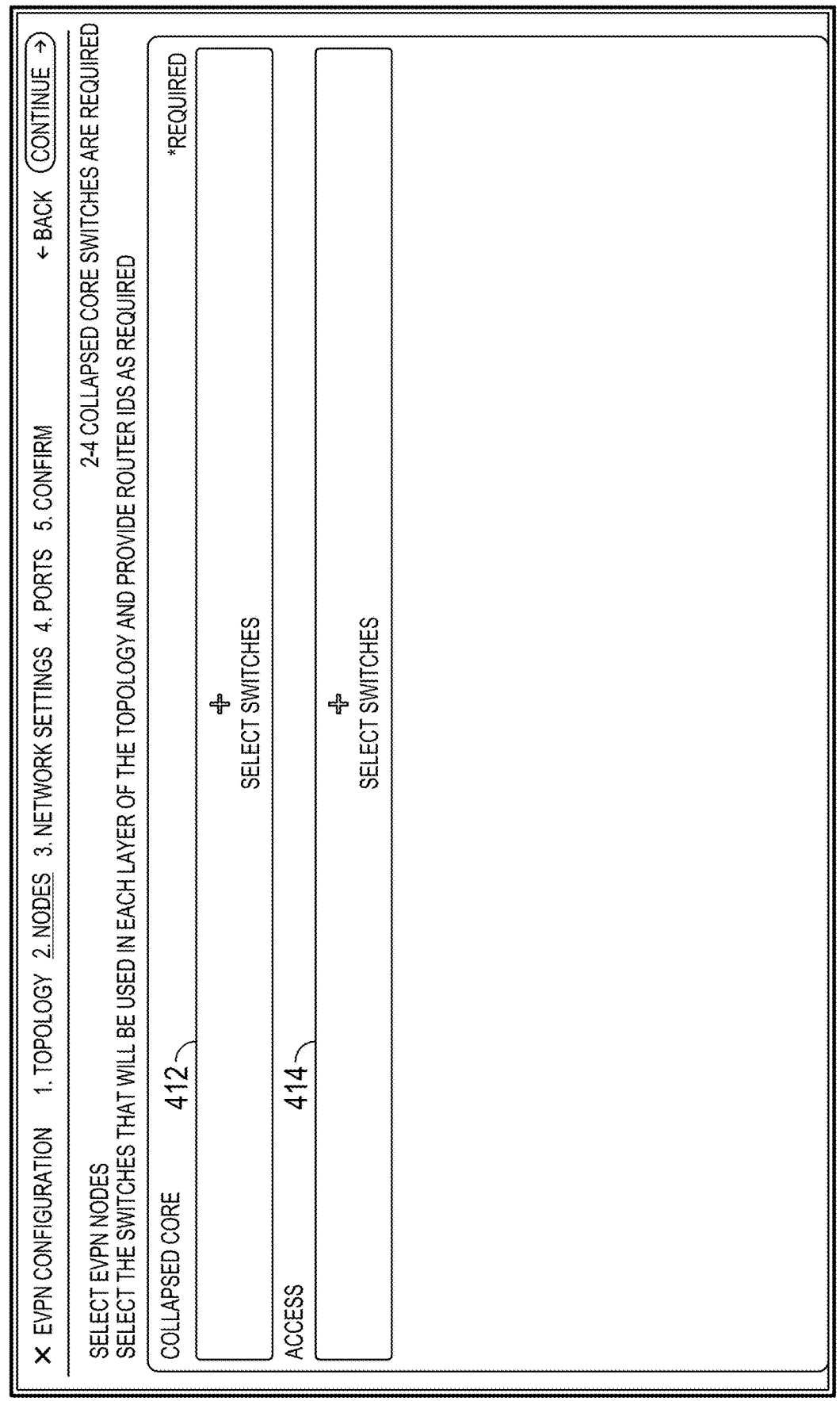

In the example of FIG. 4B, EVPN topology configuration engine 270 may generate data representative of a common user interface 410 including UI elements representing core devices and access devices with which to configure and establish the EVPN multihoming topology. As one example, NMS 200 may obtain network data associated with network devices (e.g., access devices 126 and core devices 124 of FIG. 1A) with which to establish an EVPN multihoming topology. In this example, NMS 200 may obtain network data associated with core devices 124 and access devices 126 within IP fabric 118, the network data including, for example, MAC address, serial number, model type, status (e.g., connected, not connected), site location, etc., of the network devices. NMS 200 may store the network data within database 218 as network data 216 and/or within EVPN topology configuration engine 270. For example, NMS 200 may include an interface, such as an application programming interface (API) 220, to obtain network data associated with the network devices within IP fabric 118.

EVPN topology configuration engine 270 may use network data 216 associated with core devices 124 and access devices 126 to generate data representative of a common UI including UI elements representing access devices 126 and core devices 124 to establish an EVPN multihoming topology. In this example, common user interface 410 includes selectable user interface elements for adding core devices 412 and access devices 414 to configure and establish the EVPN multihoming topology. EVPN topology configuration engine 270 may receive, via the common user interface on a display device, an indication of a user input to add access devices and core devices and in response, EVPN topology configuration engine 270 may generate UI elements within the common UI, such as a selectable list of the access devices and a selectable list of core devices of collapsible core network 118 to be configured for the EVPN multihoming topology, as shown in FIG. 4C.

In FIG. 4C, EVPN topology configuration engine 270 generates UI elements representing selectable list 422 of network devices within common user interface 420. In some examples, the selectable list 422 of network devices may be overlaid on top of the common user interface 410 of FIG. 4B or may be generated as part of a separate user interface. In some examples, EVPN topology configuration engine 270 generates UI elements representing options to individually select network devices (e.g., user interface elements 424A-424G), and/or an option to select all AP devices (e.g., user interface element 426) that are available. In some examples, EVPN topology configuration engine 270 generates data representative of an input field to enable a user to specify an identifier 428 (e.g., IP address) for a network device. In some examples, selectable list 422 may include UI elements representing only core devices, only access devices, or a combination of core devices and access devices.

As described above, EVPN topology configuration engine 270 may include a validation module 275 to validate whether a network device may be used to establish the EVPN multihoming topology. In the example of FIG. 4D, EVPN topology configuration engine 270 may generate data representative of a selectable list of network devices further including an indication 432 (e.g., warning icon) for each network device that is unusable for the EVPN multihoming topology, and/or disabling the UI element representing the network device (e.g., user interface elements 434A-434C) from being selected for the EVPN multihoming topology.

Figure 4E:
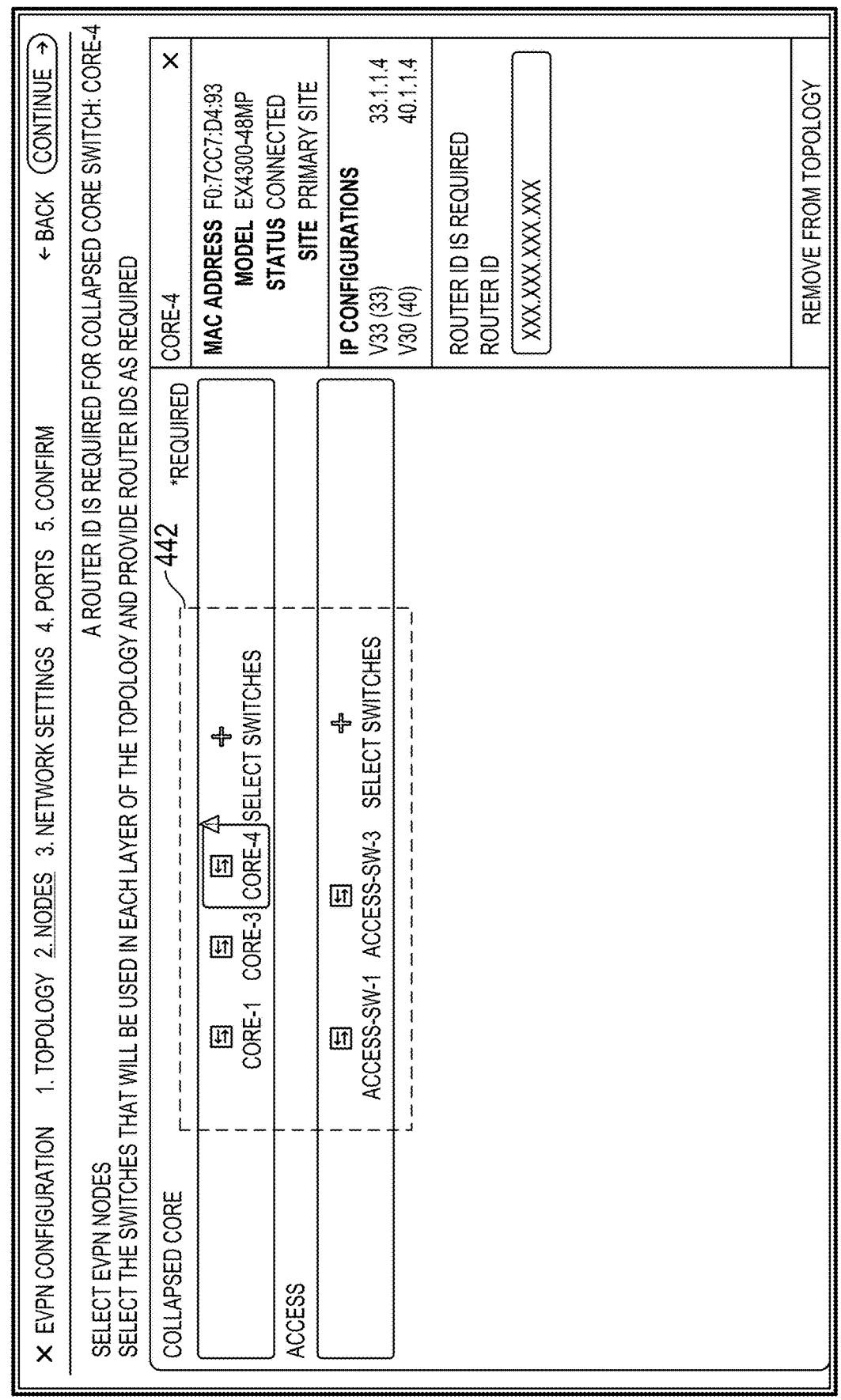

In the example of FIG. 4E, EVPN topology configuration engine 270 may generate data representative of a common user interface 440 including UI elements representing the selected core devices and access devices in an abstracted view of the EVPN multihoming topology. For example, common user interface 440 may include, as one example, UI elements representing a visualization 442 of the EVPN multihoming topology (without connections) in which the selected core devices are visually grouped together and the selected access devices are visually grouped together. In some examples, common user interface 440 includes selectable user interface elements for adding additional core devices and/or access devices to configure and establish the EVPN multihoming topology.

In some examples, common user interface 440 includes UI elements representing selected network devices for a single EVPN multihoming topology. Additionally, or alternatively, common user interface 440 includes UI elements representing all selected network devices for all EVPN multihoming topologies.

In some examples, common user interface 440 may also include UI elements representing errors in configuration of network devices for the EVPN multihoming topology. In this example, common user interface 440 may include UI elements representing an error of Core-4 not being configured with a router identifier. In some examples, the UI element representing the error may be an icon and/or text indicating which of the selected network devices have an error in configuration.

In the example of FIG. 4F, EVPN topology configuration engine 270 may generate data representative of a common user interface 450 including user interface elements representing various network configurations, such as VLANs 451 to add one or more VLANs for use in the EVPN multihoming topology, network specific configurations 452 (illustrated as "Other IP Configuration") to specify IP configurations (e.g., DHCP and/or Static IP configurations), VRFs 453 to add VRFs to the EVPN multihoming topology, aggregated Ethernet indexes to specify a list or range of indexes for aggregated Ethernet interfaces, and port configurations 455 to specify the mode (e.g., trunk or access), VLANs for a trunk network, speed, duplex, MAC limit, or other configurations of the ports of the network devices.

Figure 4G:
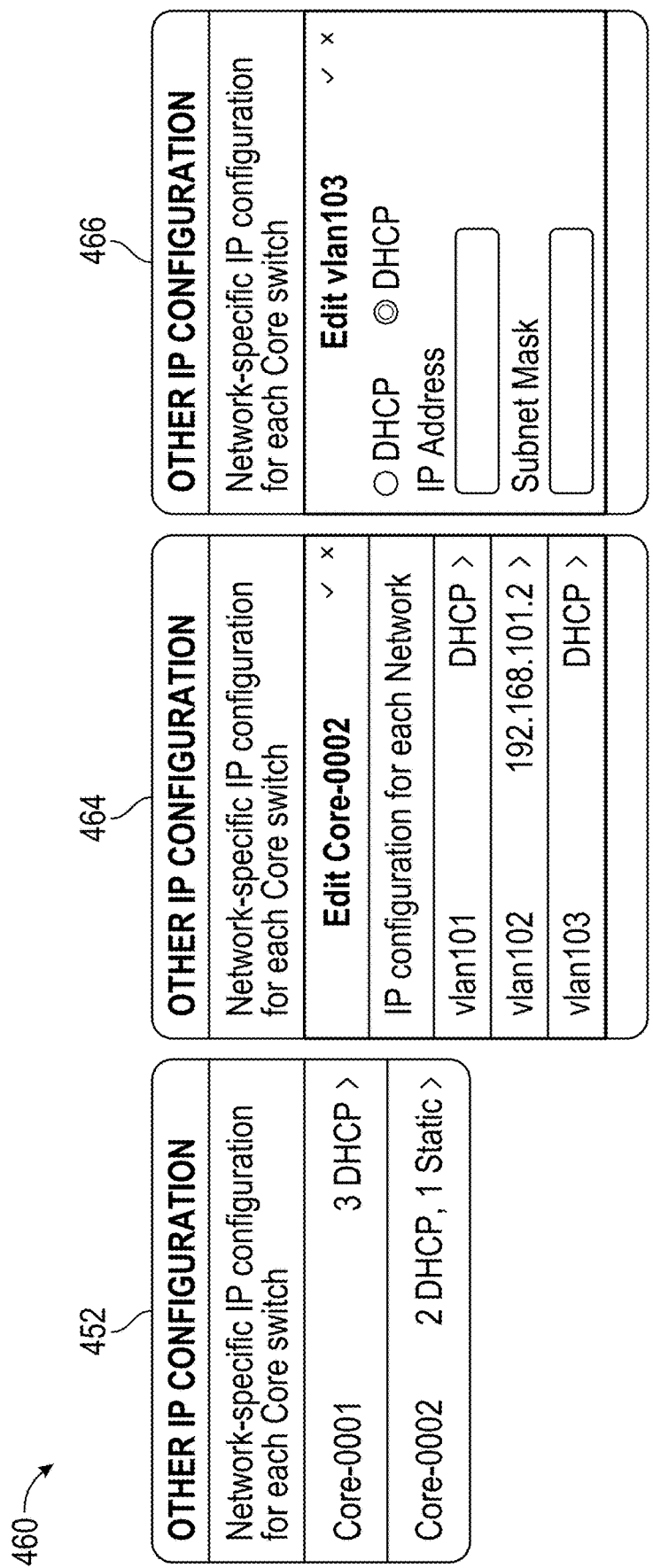

In the example of FIG. 4G, EVPN topology configuration engine 270 may generate data representative of a common user interface 460 including user interface elements representing network specific configurations 452 (illustrated as "Other IP Configuration") of FIG. 4F in further detail. Upon the selection to add a core device within network specific configurations 452, EVPN topology configuration engine 270 may generate a common user interface 460 including UI elements representing VLANs configured for an individual core device (illustrated as user interface element 464). Upon the selection of a VLAN for the core device within user interface element 464, EVPN topology configuration engine 270 may generate UI elements representing the IP configuration of a particular VLAN (illustrated as user interface element 466) to specify whether the VLAN should be DHCP or static (e.g., specify the IP address and the subnet mask for static configuration).

Figure 4H:
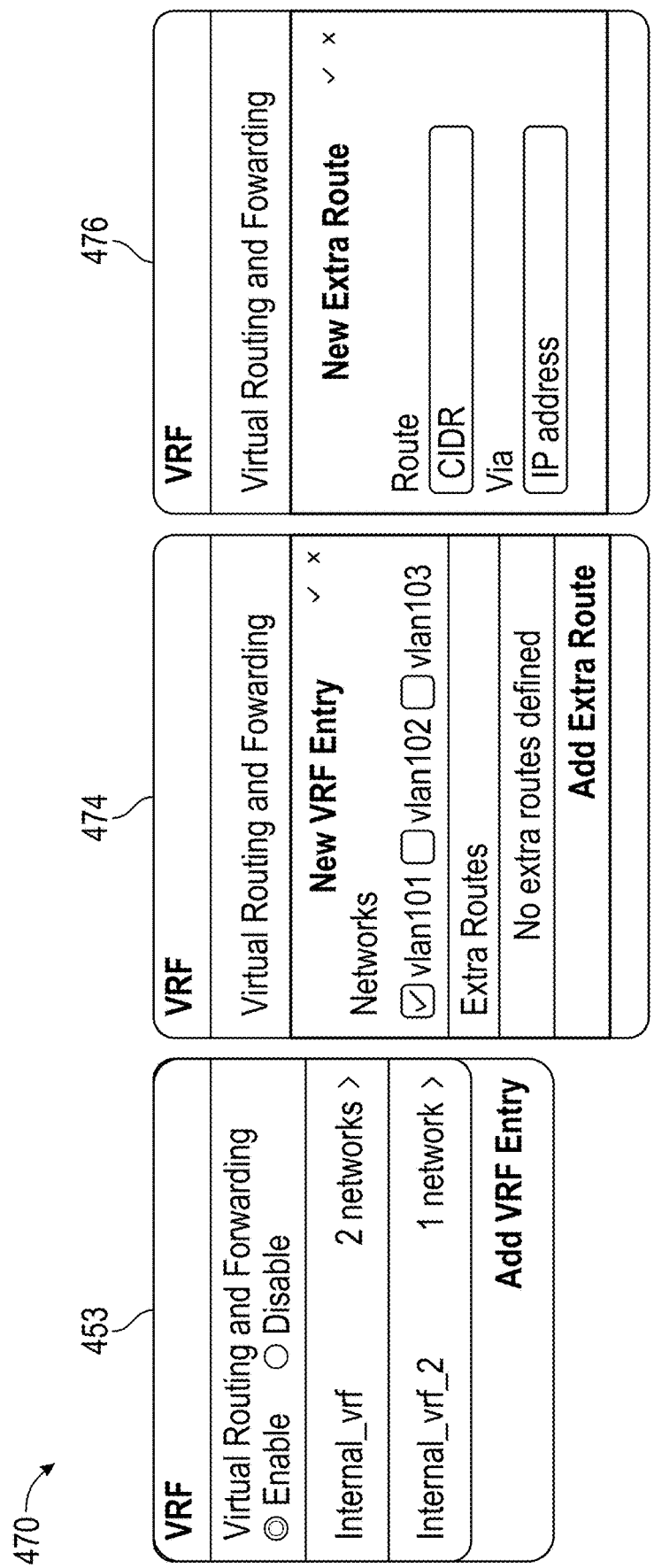

In the example of FIG. 4H, EVPN topology configuration engine 270 may generate data representative of a common user interface 470 including user interface elements representing VRFs 453 of FIG. 4F in further detail. Upon the selection of a particular VRF within VRFs 453, EVPN topology configuration engine 270 may generate a common user interface 470 including UI elements representing one or more VLANs (illustrated as user interface element 474) used to configure a VRF entry. Upon the selection to add an extra route for the VRF entry, EVPN topology configuration engine 270 may generate UI elements representing the route configuration for the VRF (illustrated as user interface element 476) to specify the route and the IP address for the VRF entry.

Figure 4I:
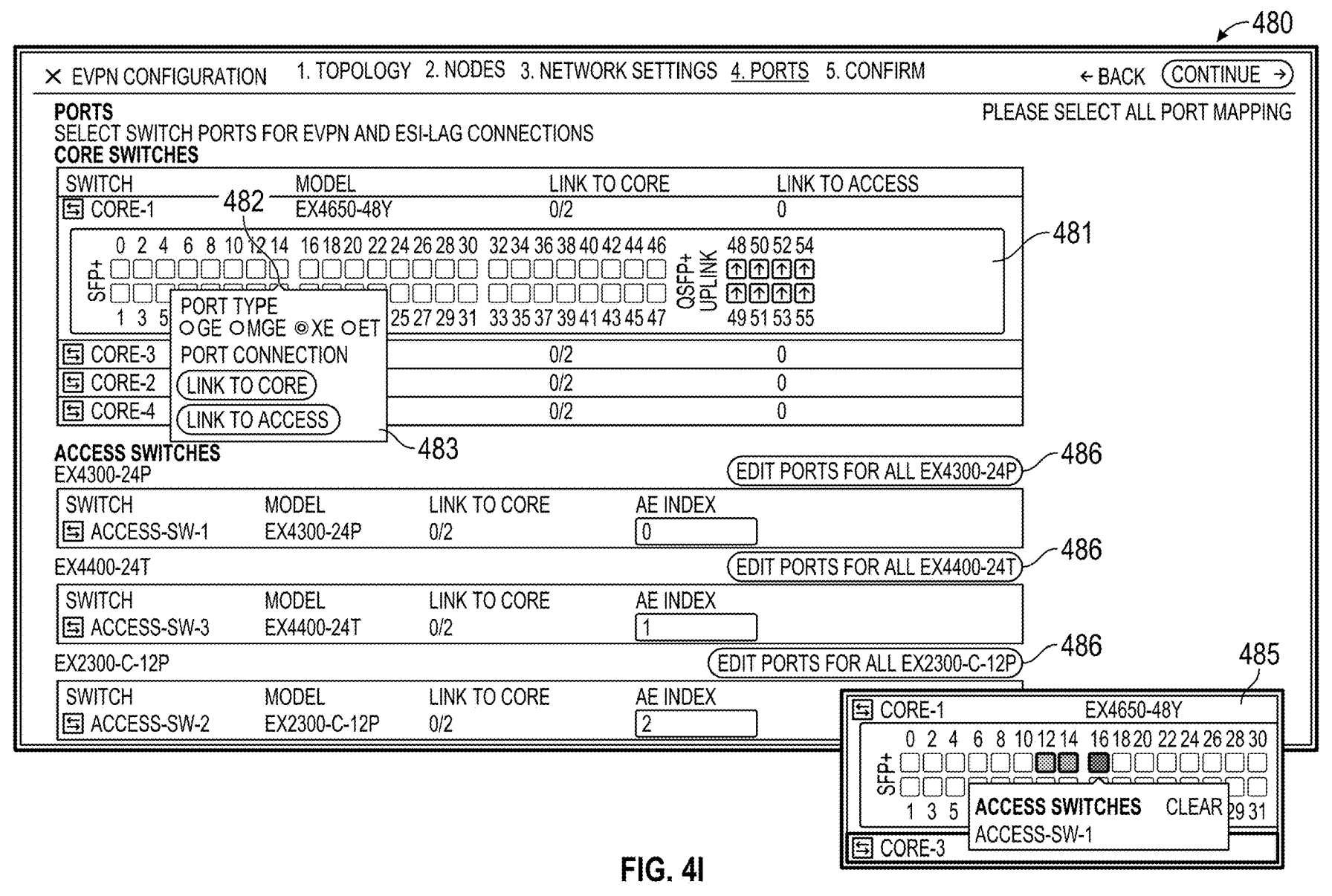

In response to receiving one or more indications of user input specifying the network configuration information for the EVPN multihoming topology, EVPN topology configuration engine 270 may generate data representative of a common user interface 480 including user interface elements representing one or more ports of the network devices for configuration of the EVPN multihoming topology. In the example of FIG. 4I, common user interface 480 includes selectable UI elements representing ports of a particular network device (illustrated as user interface elements 481).

As one example, EVPN topology configuration engine 270 may receive, via the user interface on the display device, an indication of a user input specifying a particular port of core device, Core-1 (e.g., EX4650-48Y). For instance, EVPN topology configuration engine 270 may receive, via the user interface on the display device, an indication of a user input selecting UI element 482 representing a particular port of Core-1. In response, EVPN topology configuration engine 270 may generate UI elements representing a selectable list 483 of options to configure the selected port as a connection to/from the core network or to the access device.

As one example, EVPN topology configuration engine 270 may receive, via the user interface on the display device, an indication of a user input specifying a particular port of Core-1 and an indication of a user input specifying the port to be configured with a connection to an access device ("Link to Access") or a connection to a core device ("Link to Core"). For example, in response to a selection to configure the port for a connection to an access device, EVPN topology configuration engine 270 may generate UI elements representing a selectable list of one or more access devices to be connected to Core-1. In response to receiving one or more indications of user input selecting a port to be configured as a connection to an access device, EVPN topology configuration engine 270 may generate a UI element (e.g., port colored with a particular color as illustrated in element 485) representing the port configured as an access-facing port.

As another example, EVPN topology configuration engine 270 may receive, via the user interface on the display device, an indication of a user input specifying a particular port of Core-1 and an indication of a user input specifying the port to be configured with a connection to/from the core network ("Link to Core"). In response to a selection to configure the port for a connection to a core device, EVPN topology configuration engine 270 may generate UI elements representing a selectable lists 492 and 494 of FIG. 4J of one or more core device links to provide access to/from the core network. In response to receiving one or more indications of user input selecting a port to be configured as a connection to a core device, EVPN topology configuration engine 270 may generate a UI element (e.g., port colored with a particular color as illustrated in element 485) representing the port configured as core-facing port. In some examples, EVPN topology configuration engine 270 may generate UI elements representing selectable options of port types (e.g., ge, mge, xe, et).

Figure 4J:
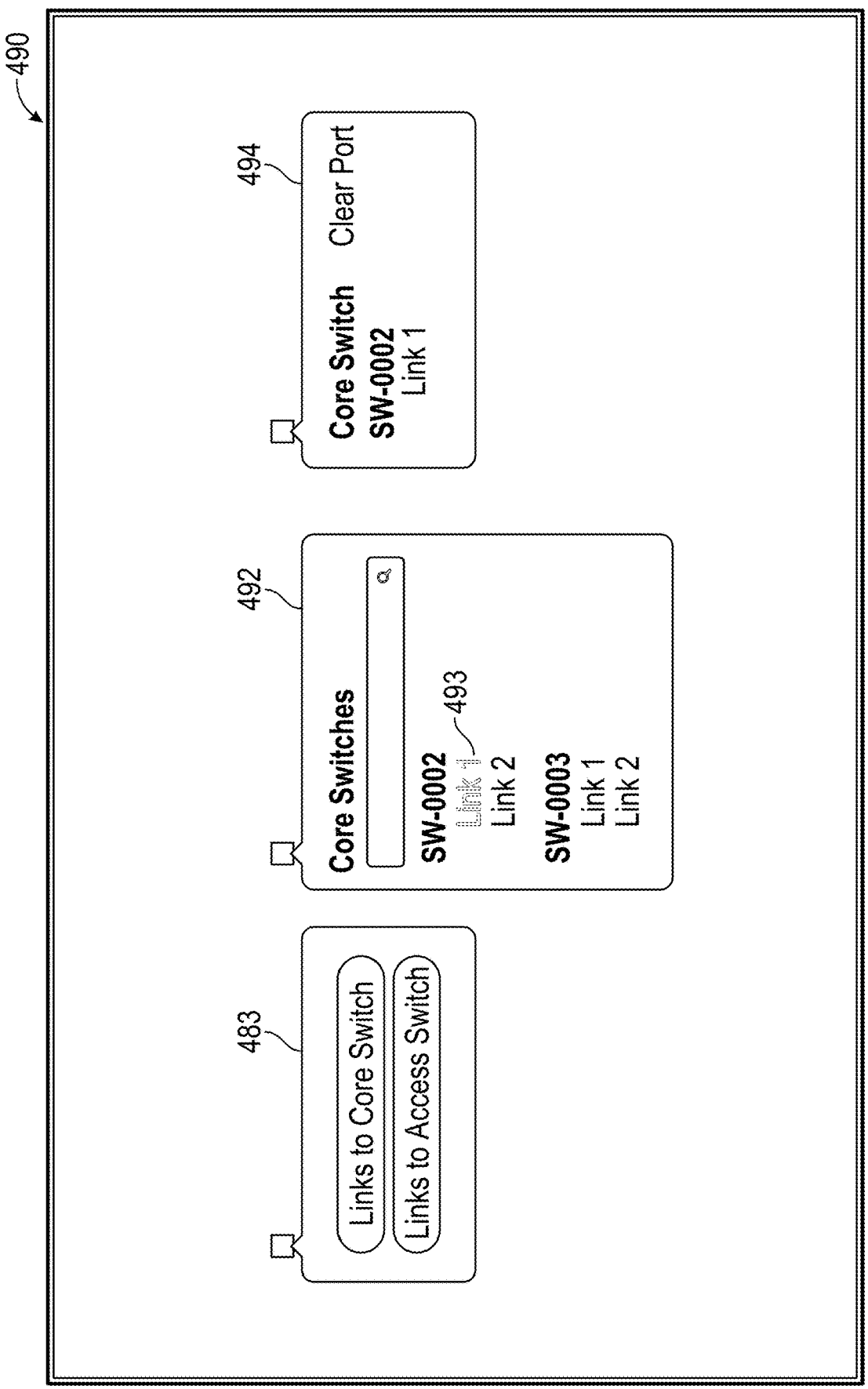

As described above, EVPN topology configuration engine 270 may include a validation module 275 to validate whether a network device may be used to establish the EVPN multihoming topology. In the example of FIG. 4I, EVPN topology configuration engine 270 may generate data representative of a selectable list of one or more access devices to be connected to Core-1 further including an indication for each network device that is unusable for the EVPN multihoming topology, and/or disabling the UI element representing the network device from being selected for the EVPN multihoming topology. Similarly, validation module 275 may validate whether a core device links may be used to establish the EVPN multihoming topology. In the example of FIG. 4J, EVPN topology configuration engine 270 may generate data representative of a selectable list 492 of one or more core device links further including an indication for each core device link that is unusable for the EVPN multihoming topology, and/or disabling the UI element representing the link (e.g., user interface elements 493) from being selected for the EVPN multihoming topology.

Upon selection of UI element representing an access device for the multihomed connection to Core-1, EVPN topology configuration engine 270 may generate UI elements representing ports of the access device to be mapped to the selected ports of one or more access devices (e.g., "Access-sw-1," "Access-sw-2," and/or "Access-sw-3") (e.g., via a selection of UI element 486). In response to the selection of ports for the network devices of the EVPN multihoming topology, port mapping module 273 of EVPN topology configuration engine 270 may automatically map the ports of the network devices for the ESI-LAG. For example, EVPN topology configuration engine 270 may automatically associate an ESI-LAG to the selected ports of the core devices and access device, such as autogenerating an aggregated Ethernet identifier from the aggregated Ethernet indexes specified in the network settings. In some examples, EVPN topology configuration engine 270 may generate UI elements representing selectable options of port types (e.g., ge, mge, xe, et) for the plurality of access devices.

Figure 4K:
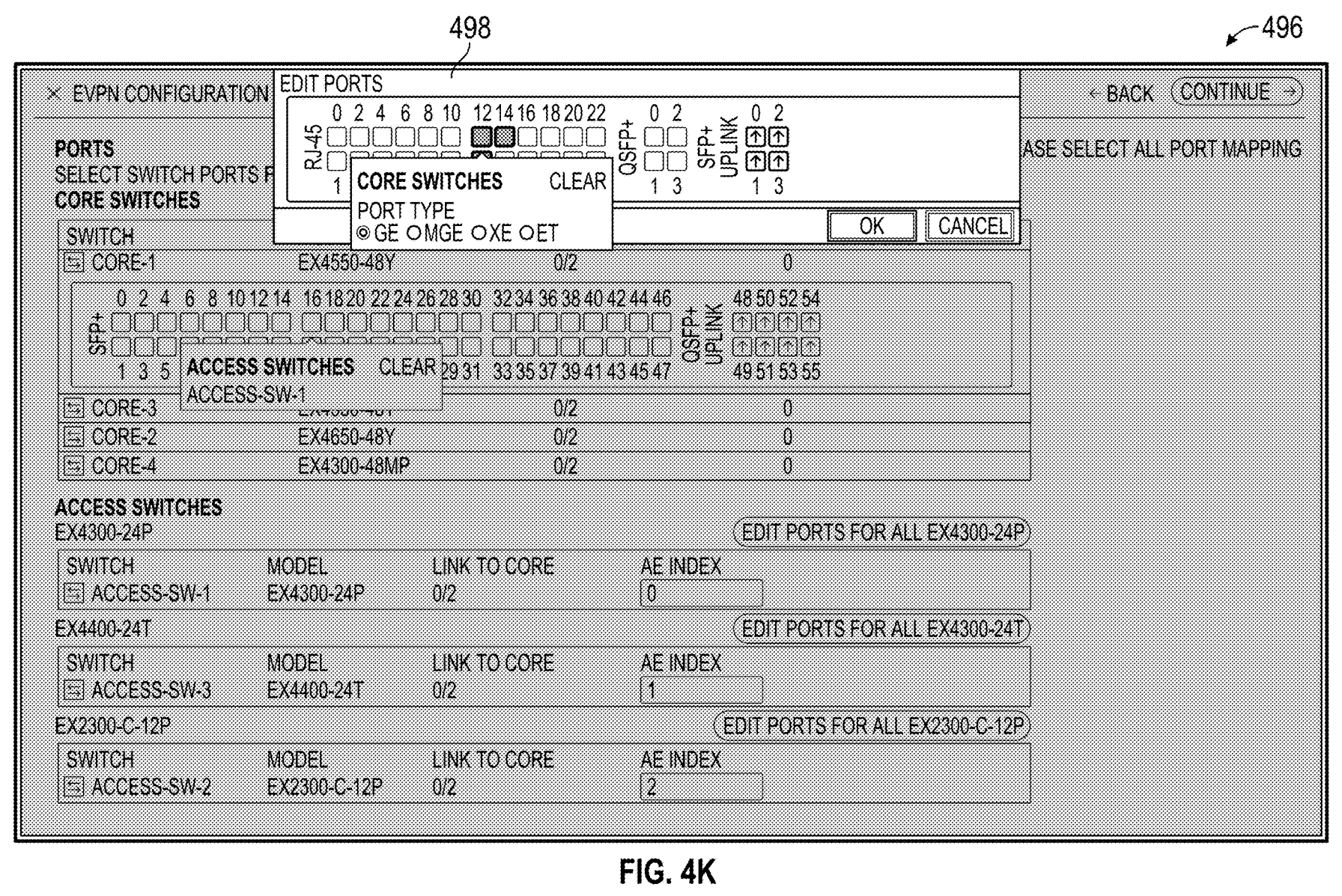

In the example of FIG. 4K, EVPN topology configuration engine 270 may generate data representative of a common user interface 496 including UI elements representing ports of a group of access devices or ports of a group of core devices that are grouped by model. For example, common user interface 496 may include UI elements 498 representing one or more ports of a plurality of access devices of a same or similar model to enable a user to bulk edit ports across access devices of the same or similar model. Similarly, common user interface 496 may include UI elements representing one or more ports of a core device representing a plurality of core devices of a same or similar model to enable a user to bulk edit ports across core devices of the same or similar model.

Figure 4L:
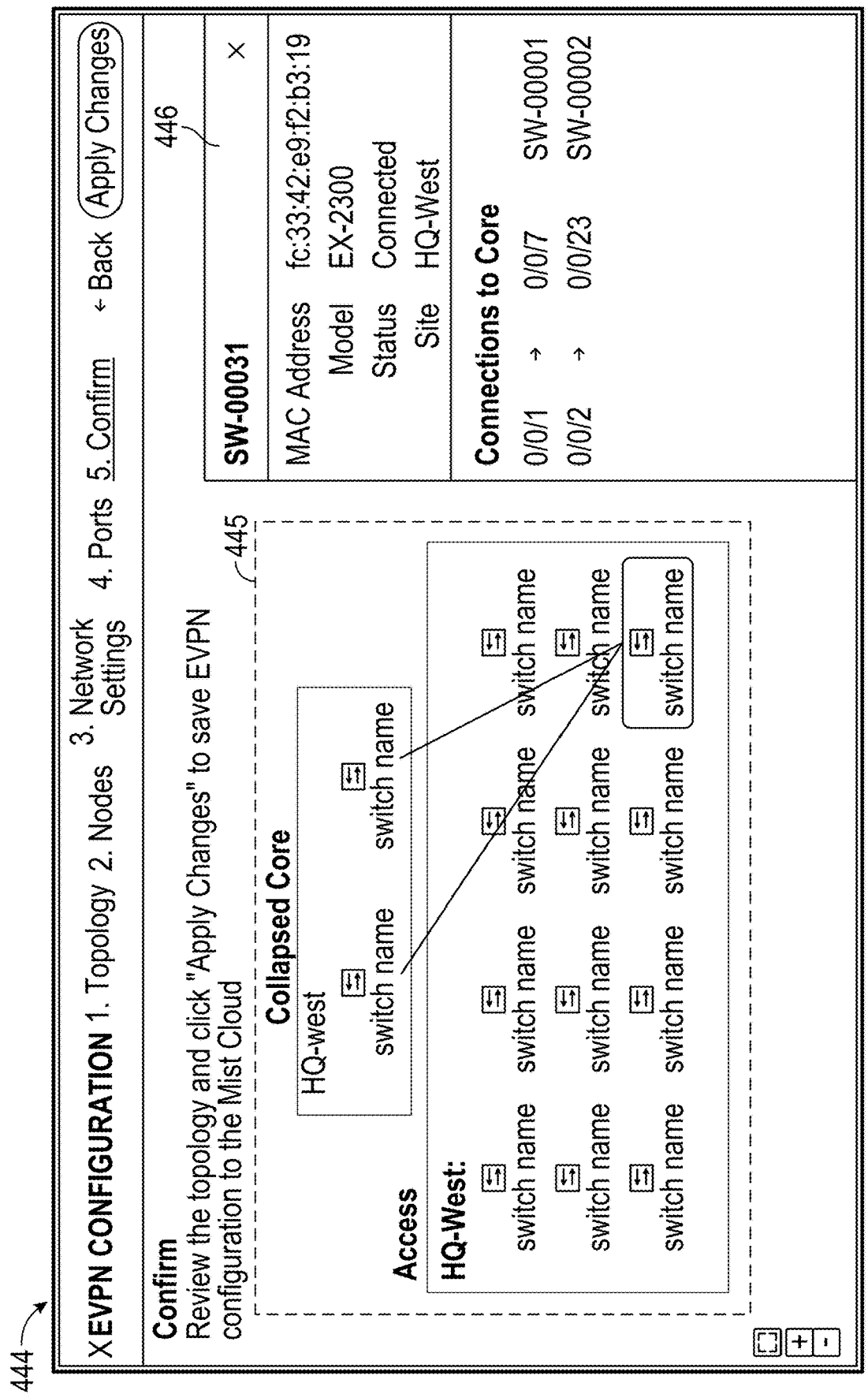

In the example of FIG. 4L, EVPN topology configuration engine 270 may generate data representative of a common user interface 444 including UI elements representing the selected core devices and access devices and the connections from an access device to one or more core devices. In this example, common user interface 444 may provide, as one example, a visualization 445 of the EVPN multihoming topology with connections from the access device to the core devices. Common user interface 444 may also include information 446 associated with the access device including the MAC address, model, status, site, and interface connections to the core devices (e.g., SW-00001 and SW-00002).

Figure 4M:
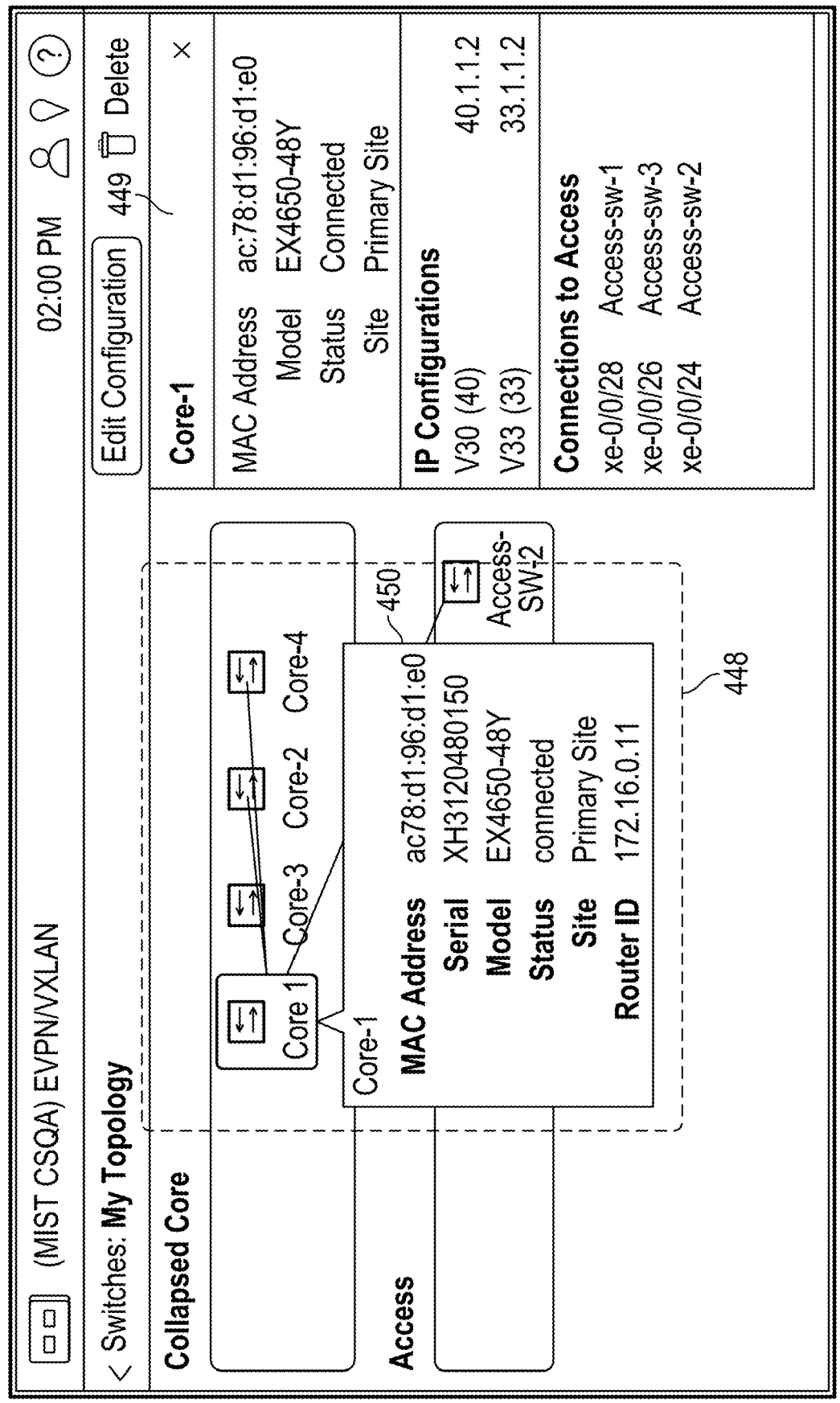

Similarly, in the example of FIG. 4M, EVPN topology configuration engine 270 may generate data representative of a common user interface 447 including UI elements representing the selected core devices and access devices and the connections from a core device to one or more access devices. In this example, common user interface 447 may provide, as one example, a visualization 448 of one or more EVPN multihoming topologies with connections from the core device to one or more access devices. Common user interface 447 may also include information 449 associated with the core device including the MAC address, model, status, site, and interface connections to core devices (e.g., Core-4) and interface connections to access devices (e.g., Access-sw-1, Access-sw-2, and Access-sw-3). In some examples, EVPN topology configuration engine 270 may receive an indication of a user input to common user interface 447 to select (or hover) on a UI element representing a particular device (core device or access device) and in response may generate a pop-up display 450 overlaid on the common user interface 447 with additional information associated with the selected device.

EVPN topology configuration engine 270 may use the information specified by the user input to the common user interface to configure the selected access devices and core devices to establish the EVPN multihoming topology. For example, common user interface 446 may include UI element 449 to apply the topology configuration. In response to receiving a user input selecting UI element 449 to apply the topology configuration, EVPN topology configuration engine 270 may execute an API PUT request to cause API 220 to update a network settings API resource for the EVPN multihoming topology with network settings information specified by user input to common user interface 400 of FIG. 4A (e.g., topology scope, overlay settings, underlay settings) and/or the information specified by user input to common user interface 450 of FIG. 4F (e.g., VLANs, other IP configuration, VRFs, aggregated Ethernet indexes, and port configuration settings), common user interface 460 of FIG. 4G (e.g., IP address and subnet mask for individual VLANs), common user interface 470 of FIG. 4H (e.g., routes of VLANs).

EVPN topology configuration engine 270 may execute API PUT requests to cause API 220 to update core device API resources of the EVPN multihoming topology with network device information specified by user input to common user interface 420 of FIG. 4C (e.g., network device ID of selected network device) and/or the other IP configuration information specified by user input to common user interface 450 of FIG. 4F (e.g., VLANs, other IP configuration, and VRFs) and common user interface 460 of FIG. 4G (e.g., IP address and subnet mask for individual VLANs).

To build the EVPN topology, EVPN topology configuration engine 270 may execute an API POST request to cause API 220 to create an EVPN topology API resource for the EVPN multihoming topology with EVPN topology information specified by user input to common user interface 410 of FIG. 4B and common user interface 420 of FIG. 4C to select two or more core devices and at least one access device for the EVPN multihoming topology.

A record output of the API POST request may include, for each of the network devices, a MAC address, EVPN identifier, model, router ID (e.g., IP address), role, links (e.g., uplinks/downlinks), and IP addresses of the links. In the example EVPN multihoming topology of FIG. 1A, the record output of the post request may include topology relationship information for each of core device 124A and core device 124B including a MAC address the core device, an EVPN identifier, model of the core device, router ID, a role set as a core device, uplink (e.g., MAC address of the other core device of the ESI-LAG), downlink (e.g., MAC addresses of the other core device of the ESI-LAG), and an IP address of the downlink (e.g., either auto-generated if DHCP or specified by a user if static as specified by user input to common user interface 460 of FIG. 4G.

EVPN topology configuration engine 270 may execute API PUT requests to cause API 220 to update core device API resources including port configuration information (e.g., port identifier, port usage) specified by user input to common user interface 480 of FIG. 4I, including the ESI-LAG generated by port mapping module 273 from the aggregated Ethernet indexes specified by user input to the UI element 454 of common user interface 450 of FIG. 4F, and user input to common user interface 490 of FIG. 4J. In some examples, EVPN topology configuration engine 270 may execute an API PUT request to cause API 220 to update a group of network devices (of the same or similar model) including port configuration information (e.g., port identifier, port usage) specified by user input to common user interface 496 of FIG. 4K.

NMS 130 may push the one or more API resources to a controller or orchestrator, which may use the API resources to generate configuration data to configure core devices 124 and access device 126A to establish the EVPN multihoming topology. In some examples, EVPN topology configuration engine 135 may export the topology relationship information (e.g., as a comma-separated value (CSV) file or other type of file) such that a user may use the topology relationship information to wire the connections between core devices 124 and access device 126A to establish the EVPN multihoming topology.

FIGS. 5A-5F illustrate examples of a common user interface by which a user may configure and establish an IP-CLOS topology, in accordance with the techniques described in this disclosure. The common user interface examples described in FIGS. 5A-5F are described with respect to EVPN topology configuration engine 135 of FIG. 1B and EVPN topology configuration engine 270 of FIGS. 2A-2B. Although FIGS. 5A-5F are described with respect to an EVPN topology configuration engine generating data representative of the common user interfaces, the techniques may also be described with respect to a UI module (e.g., UI module 271 of FIG. 2B) generating data representative of the common user interfaces.

Figure 5A:
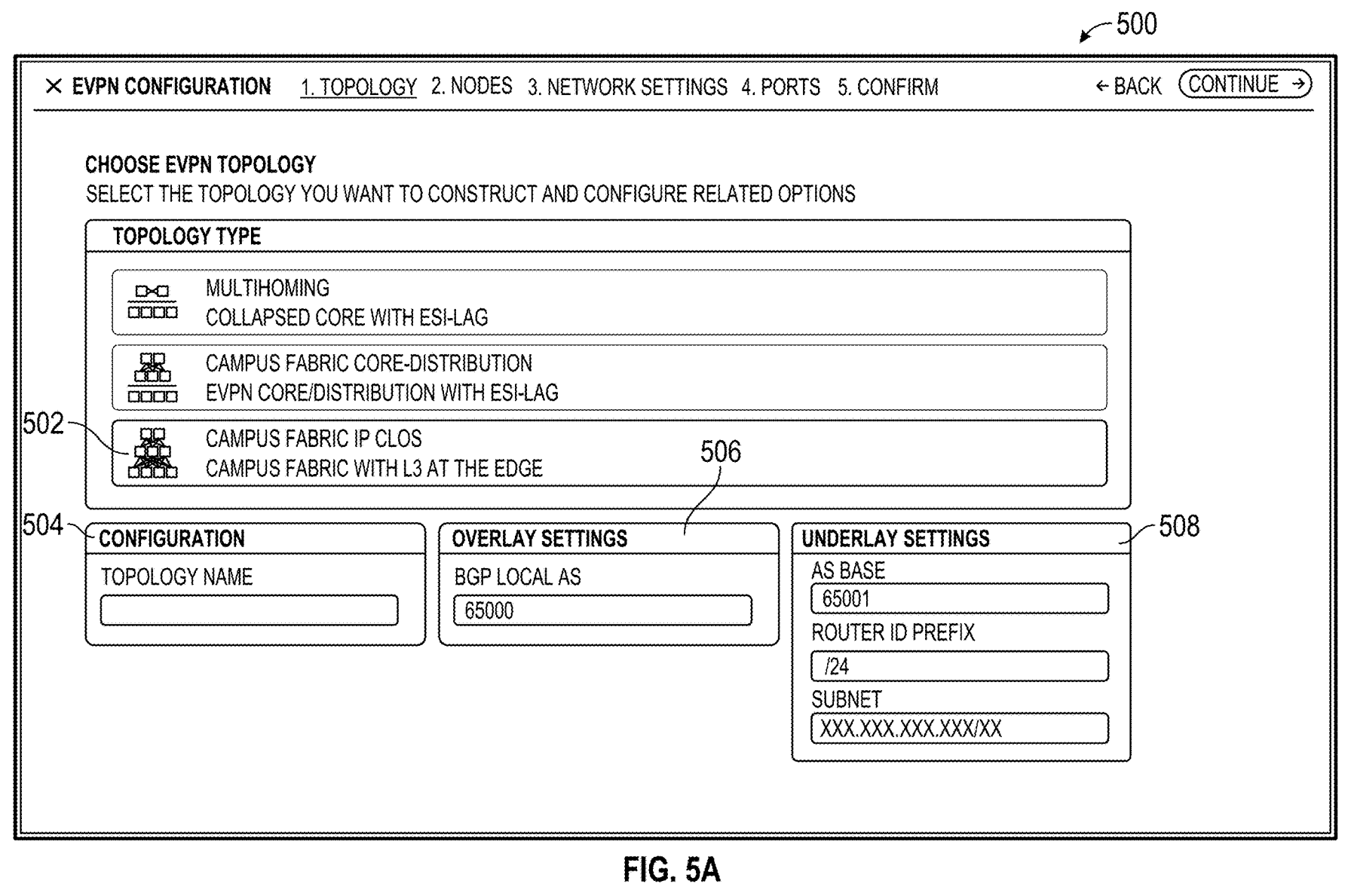

In the example of FIG. 5A, EVPN topology configuration engine 270 may generate data representative of a common user interface 500 including user interface elements representing the type of EVPN topology to configure and establish, such as an IP-CLOS topology 502, topology name 504, overlay settings 506, and underlay settings 508. The UI elements representing the topology name 504 may include an option to specify the name of an IP-CLOS topology.

EVPN topology configuration engine 270 may generate data representative of an input field to enable a user to specify overlay settings 506 and underlay settings 508 of the IP-CLOS topology. For example, common user interface 500 may include an input field to enable a user to specify overlay settings 506 such as an Autonomous System (AS) identifier of the network in which the IP-CLOS topology is to be established, such as an AS used with Border Gateway Protocol (BGP) (e.g., BGP Local AS). Common user interface 500 may include an input field to enable a user to specify underlay settings 508 such as an Autonomous System base, a router ID prefix, and a subnet.

Figure 5B:
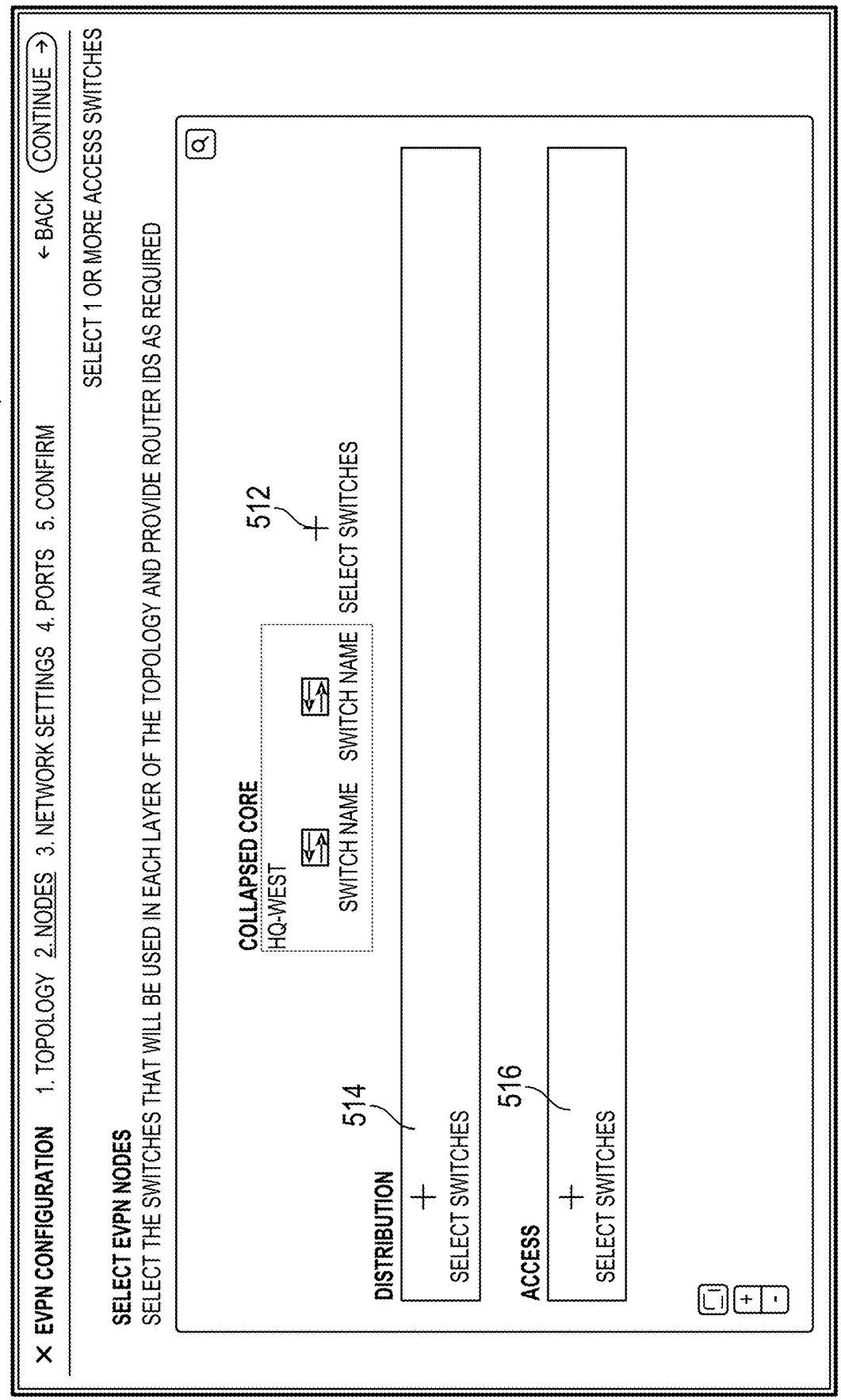

In the example of FIG. 5B, EVPN topology configuration engine 270 may generate data representative of a common user interface 510 including UI elements representing core devices, distribution devices, and access devices with which to configure and establish the IP-CLOS topology. As one example, NMS 200 may obtain network data associated with network devices (e.g., access devices 126, distribution devices 125, and core devices 124 of FIG. 1B) with which to establish an IP-CLOS topology. In this example, NMS 200 may obtain network data associated with core devices 124, distribution devices 125, and access devices 126 within IP fabric 118, the network data including, for example, MAC address, serial number, model type, status (e.g., connected, not connected), site location, etc., of the network devices. NMS 200 may store the network data within database 218 as network data 216 and/or within EVPN topology configuration engine 270. For example, NMS 200 may include an interface, such as an application programming interface (API) 220, to obtain network data associated with the network devices within IP fabric 118.

EVPN topology configuration engine 270 may use network data 216 associated with core devices 124, distribution devices 125, and access devices 126 to generate data representative of a common UI including UI elements representing access devices 126, distribution device 125, and core devices 124 to establish an IP-CLOS topology. In this example, common user interface 510 includes selectable user interface elements for adding core devices 512, distribution devices 514, and access devices 516 to configure and establish the IP-CLOS topology. EVPN topology configuration engine 270 may receive, via the common user interface on a display device, an indication of a user input to add access devices, distribution devices, and core devices and in response, EVPN topology configuration engine 270 may generate UI elements within the common UI, such as a selectable list of the access devices, a selectable list of distribution devices, and a selectable list of core devices of IP fabric network 118 to be configured for the IP-CLOS topology (similarly as shown in FIG. 4C).

Figure 5C:
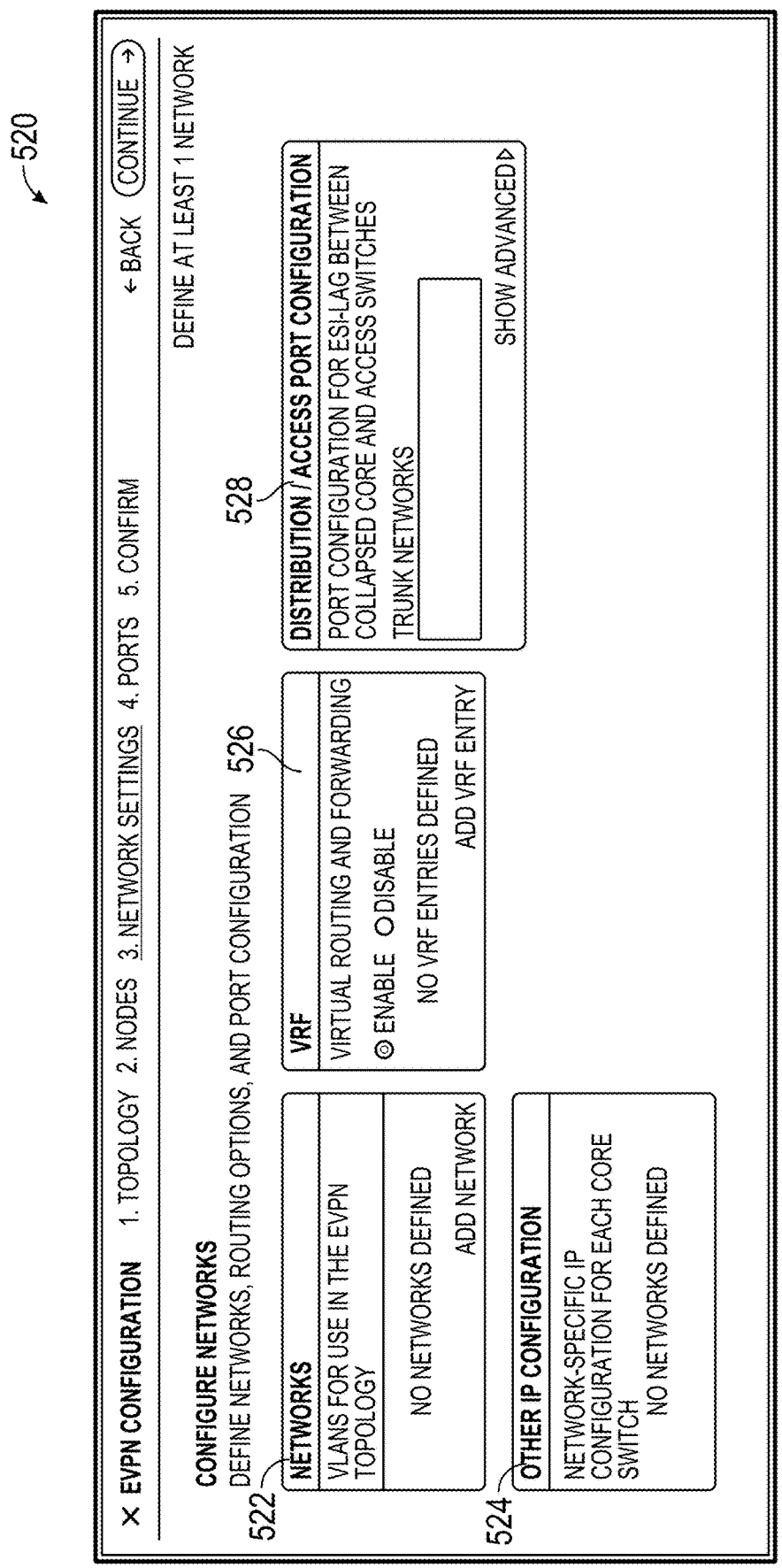

In the example of FIG. 5C, EVPN topology configuration engine 270 may generate data representative of a common user interface 520 including user interface elements representing various network configurations, such as VLANs 522 to add one or more VLANs for use in the IP-CLOS topology, network specific configurations 524 (illustrated as "Other IP Configuration") to specify IP configurations (e.g., DHCP and/or Static IP configurations), VRFs 526 to add VRFs to the IP-CLOS topology, and port configurations 528 to specify the mode (e.g., trunk or access), VLANs for a trunk network, speed, duplex, MAC limit, or other configurations of the ports of the network devices.

Figure 5D:
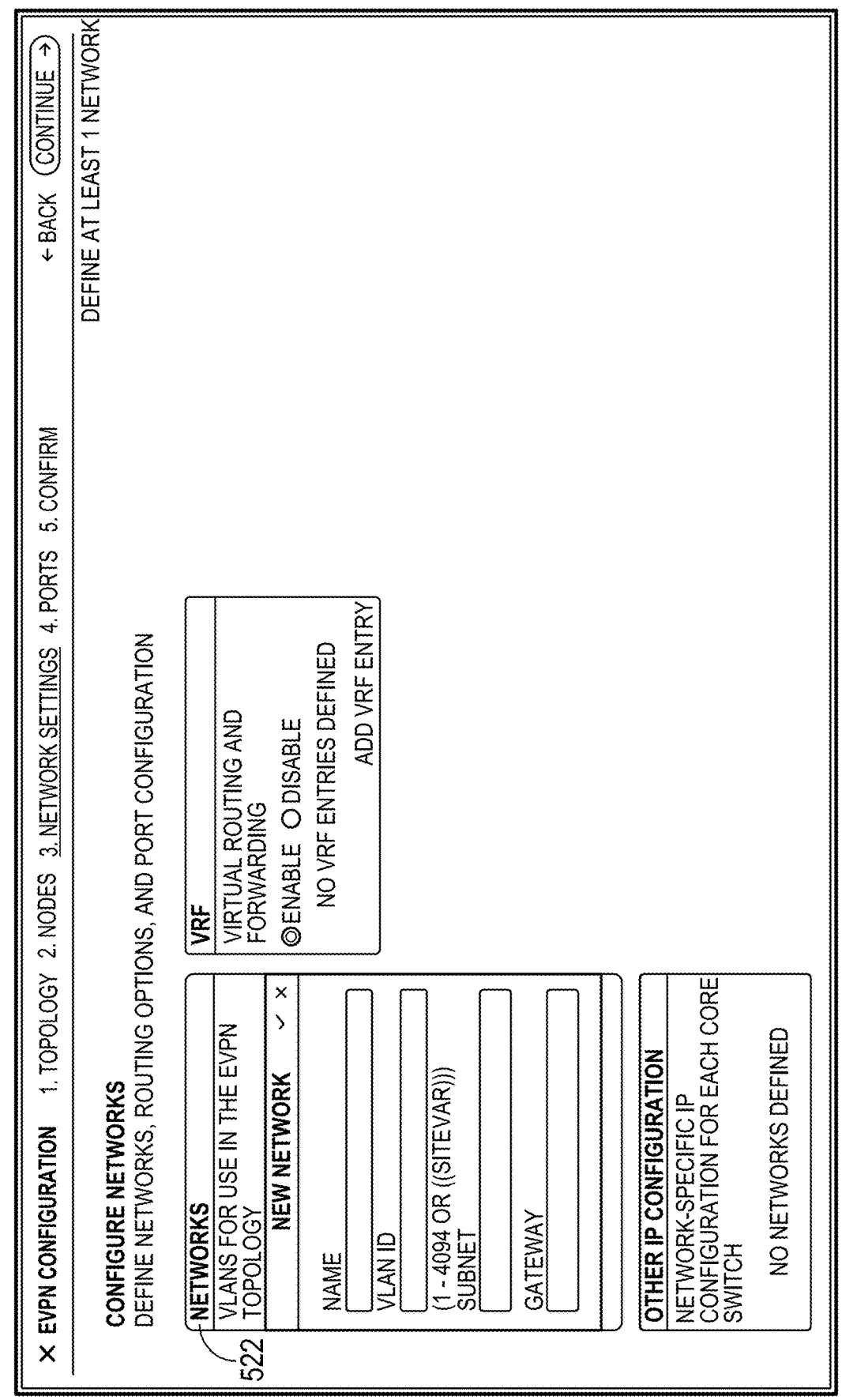

In the example of FIG. 5D, EVPN topology configuration engine 270 may generate data representative of a common user interface 530 including user interface elements representing configuration of VLANs 522 of FIG. 5C in further detail. Upon the selection to add a VLAN to the IP-CLOS topology, EVPN topology configuration engine 270 generates data representative of an input field to enable a user to specify a name of the VLAN, a VLAN identifier, a subnet, and a gateway.

In response to receiving one or more indications of user input specifying the network configuration information for the IP-CLOS topology, EVPN topology configuration engine 270 may generate data representative of a common user interface 540 including user interface elements representing one or more ports of the network devices for configuration of the IP-CLOS topology. In the example of FIG. 5E (illustrated as FIGS. 5E-1 and 5E-2), common user interface 540 includes selectable UI elements representing ports of core devices (e.g., UI elements 542), distribution devices (e.g., UI elements 544), and access devices (e.g., UI elements 547).

As one example, EVPN topology configuration engine 270 may receive, via the user interface on the display device, an indication of a user input specifying a particular port of core device SW-0003. For instance, EVPN topology configuration engine 270 may receive, via the user interface on the display device, an indication of a user input selecting UI element 543 representing a particular port of core device SW-0003 from among the UI elements 542 representing the ports of core device SW-0003. In response, EVPN topology configuration engine 270 may generate UI elements representing a selectable list of options (not shown) to configure the selected port as a connection to/from the core network or to a distribution device. EVPN topology configuration engine 270 may similarly receive, via the user interface on the display device, an indication of a user input selecting UI element 548 representing a particular port of access device SW-1005 from among the UI elements 547 representing the ports of access device SW-1005. In response, EVPN topology configuration engine 270 may generate UI elements representing a selectable list of options (not shown) to configure the selected port as a connection to a distribution device.

EVPN topology configuration engine 270 may also receive, via the user interface on the display device, an indication of a user input specifying a particular port of distribution device SW-1006. For instance, EVPN topology configuration engine 270 may receive, via the user interface on the display device, an indication of a user input selecting UI element 545 representing a particular port of distribution device SW-1006 from among the UI elements 544 representing the ports of distribution device SW-1006. In response, EVPN topology configuration engine 270 may generate UI elements representing a selectable list 546 of options to configure the selected port as a connection to the core device or as a connection to the access device. As one example, EVPN topology configuration engine 270 may receive, via the user interface on the display device, an indication of a user input specifying a particular port of distribution device SW-1006 and an indication of a user input specifying the port to be configured with a connection to a core device ("Link to Core Switch"). In response, EVPN topology configuration engine 270 may generate UI elements representing a selectable list of one or more core devices to be connected to distribution device SW-1006. EVPN topology configuration engine 270 may also receive, via the user interface on the display device, an indication of a user input specifying another port of distribution device SW-1006 and an indication of a user input specifying the port to be configured with a connection to an access device ("Link to Access Switch"). In response, EVPN topology configuration engine 270 may generate UI elements representing a selectable list of one or more access devices to be connected to distribution device SW-1006.

In response to receiving one or more indications of user input selecting ports of network devices to be configured as connections to other network devices, EVPN topology configuration engine 270 may generate a UI element (e.g., ports colored with a particular color) representing the respective connections (e.g., core device to distribution device, distribution device to access device/core device, access device to distribution device).

Figure 5F:
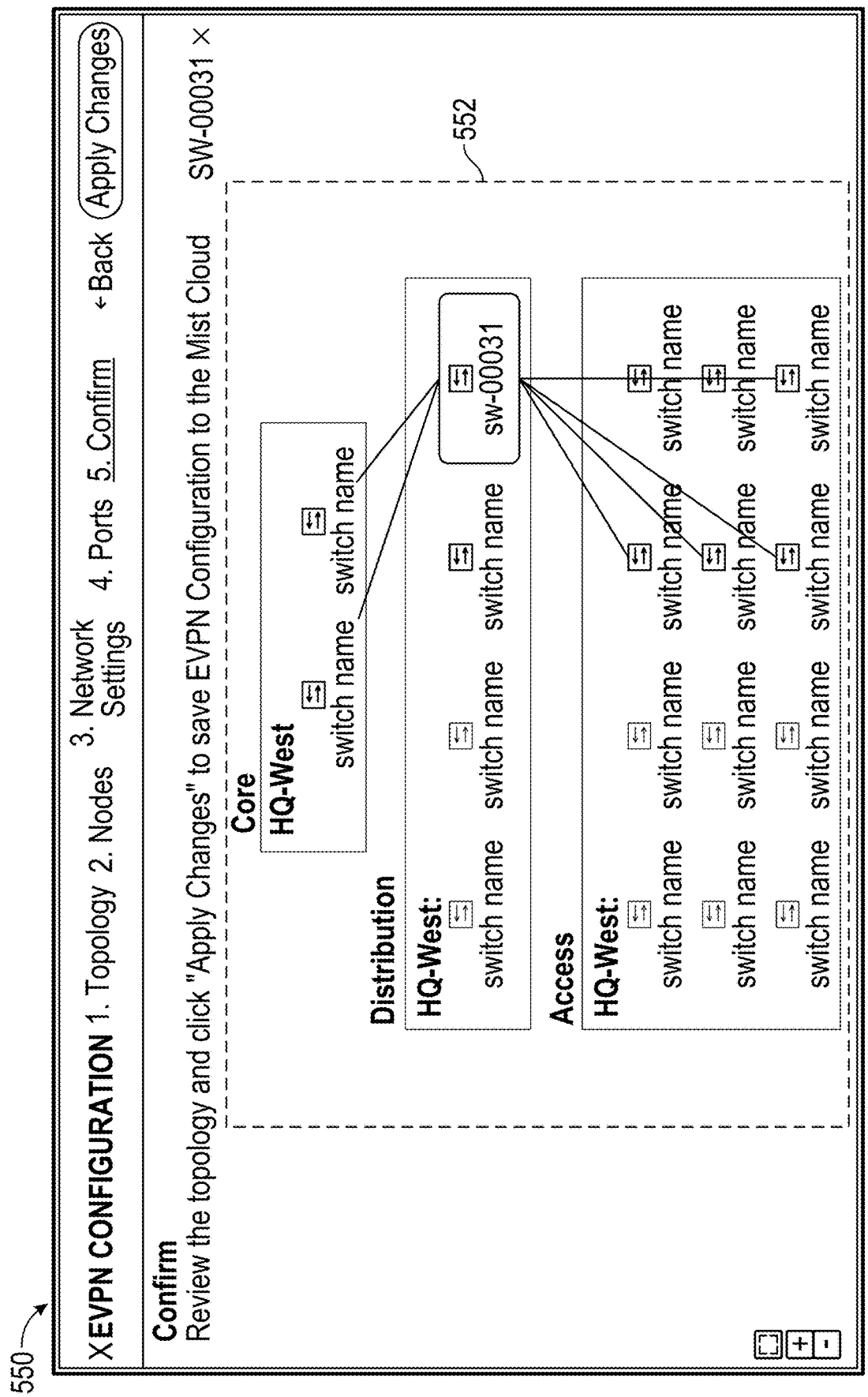

In the example of FIG. 5F, EVPN topology configuration engine 270 may generate data representative of a common user interface 550 including UI elements representing the selected network devices and the connections of the IP-CLOS topology. In this example, common user interface 550 may provide, as one example, a visualization 552 of the IP-CLOS topology with connections from the access devices to the distribution devices, and the connections from the distribution devices to the core devices. In some examples, common user interface 550 may also include information associated with the network devices (not shown) including the MAC address, model, status, site, and interface connections to the core devices.

As described above, EVPN topology configuration engine 270 may include a validation module 275 to validate whether a network device may be used to establish the IP-CLOS topology. In these examples, EVPN topology configuration engine 270 may generate UI elements representing an indication of one or more network devices that are unusable for the IP-CLOS topology, and/or disabling the UI element representing the network device from being selected for the IP-CLOS topology. Similarly, validation module 275 may validate whether links may be used to establish the connection between an access device and a distribution device or the connection between a distribution device and a core device. In these examples, EVPN topology configuration engine 270 may generate UI elements representing an indication of one or more links that are unusable for the IP-CLOS topology, and/or disabling the UI element representing the link from being selected for the IP-CLOS topology.

EVPN topology configuration engine 270 may use the information specified by the user input to the common user interface to configure the selected access devices, distribution devices, and core devices to establish the IP-CLOS topology. For example, EVPN topology configuration engine 270 may execute an API PUT request to cause API 220 to update a network settings API resource with network settings information specified by user input to common user interface 500 of FIG. 5A (e.g., topology name, overlay settings, underlay settings) and/or the information specified by user input to common user interface 520 of FIG. 5C (e.g., VLANs, other IP configuration, VRFs, and port configuration settings). In some examples, EVPN topology configuration engine 270 may use the VLAN information (e.g., name, VLAN ID, subnet, gateway) specified by user input to common user interface 530 of FIG. 5D to generate an IP address (based on the subnet) for each VLAN. In these examples, the network settings information may also include the generated IP address for each VLAN.

EVPN topology configuration engine 270 may execute an API PUT request to cause API 220 to update a network device API resource with network device information specified by user input to common user interface 510 of FIG. 5B (e.g., network device ID of selected network device) and information specified by user input to common user interface 520 of FIG. 5C (e.g., other IP configurations, VRFs), and the generated IP addresses for the VLANs. For example, EVPN topology configuration engine 270 may execute an API PUT request to cause API 220 to update an API resource for each of access devices 126 with network device information specified by user input to common user interface 510 of FIG. 5B (e.g., network device ID of the selected access device) and information specified by user input to common user interface 520 of FIG. 5C (e.g., other IP configurations, VRFs), and the generated IP addresses for the VLANs. EVPN topology configuration engine 270 may execute an API PUT request to cause API 220 to update an API resource for each of core devices 124 and distribution devices 125 with information specified by user input to common user interface 510 of FIG. 5B (e.g., network device ID of core devices and distribution devices, respectively)

To build the EVPN topology, EVPN topology configuration engine 270 may execute an API POST request to cause API 220 to create an EVPN topology API resource with EVPN topology information specified by user input to common user interface 510 of FIG. 5B (e.g., selection of one or more core devices, one or more distribution devices, and one or more access devices and the role of each selected network device).

A record output of the post request may include, for each of the network devices, a MAC address, EVPN identifier, model, router ID (e.g., IP address), role, links (e.g., uplinks/downlinks), and IP addresses of the links. In the example IP-CLOS topology of FIG. 1B, the record output of the post request may include topology relationship information for each of core device 124A and core device 124B including a MAC address the core device, an EVPN identifier, model of the core device, router ID, a role set as a core device, downlinks to distribution devices 125A and 125N (e.g., MAC addresses of distribution devices 125A and 125N), and IP addresses of the downlinks (e.g., either auto-generated if DHCP or specified by a user if static as specified by user input via other IP configuration 524 of common user interface 520 of FIG. 5C. Similarly, the record output of the post request may include topology relationship information for each of distribution device 125A and distribution device 125N including a MAC address of the distribution device, an EVPN identifier, model of the distribution device, router ID, a role set as a distribution device, uplinks to core devices 124A and 124B (e.g., MAC addresses of core devices 124A and 124B), downlinks to access devices 126A and 126N (e.g., MAC addresses of access devices 126A and 126N), and IP addresses of the downlinks. Likewise, the record output of the post request may include topology relationship information for each of access device 126A and access device 126N including a MAC address of the access device, an EVPN identifier, model of the distribution device, router ID, a role set as an access device, and uplinks to distribution devices 125A and 125B (e.g., MAC addresses of distribution devices 125A and 125N).

EVPN topology configuration engine 270 may execute an API PUT request to cause API 220 to update the network device API resources with information specified by user input to common user interface 540 of FIGS. 5E1 and 5E-2 (e.g., selected port connection information) to API 220.

NMS 130 may push the one or more API resources to a controller or orchestrator, which may use the API resources to generate configuration data to configure core devices 124, distribution devices 125, and access devices 126 to establish the IP-CLOS topology. In some examples, EVPN topology configuration engine 135 may export the topology relationship information (e.g., as a comma-separated value (CSV) file or other type of file) such that a user may use the topology relationship information to wire the connections between core devices 124, distribution devices 125, and access devices 126 to establish the IP-CLOS topology.

Figure 6:
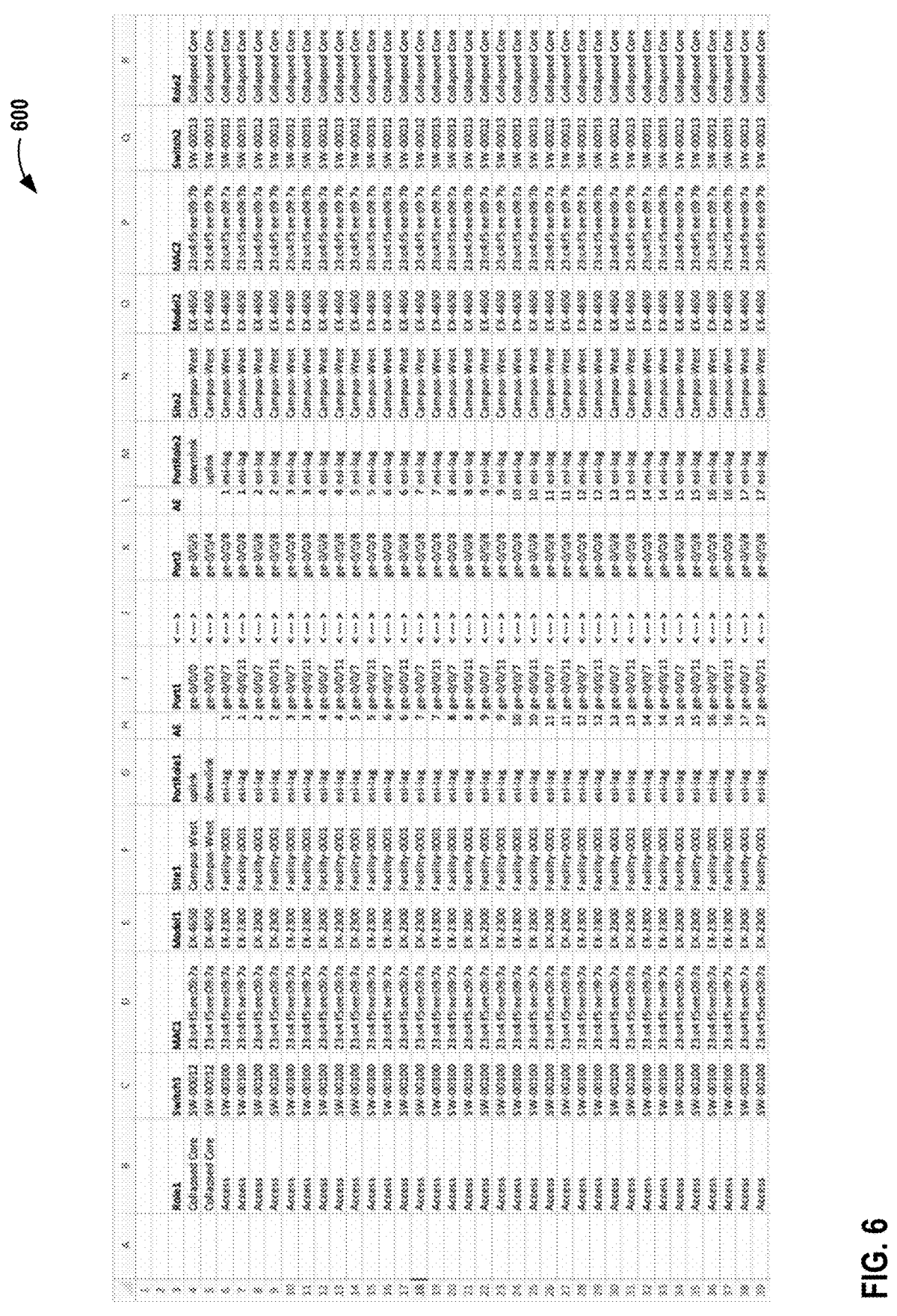

FIG. 6 illustrates an example list of port connections resulting from the configuration using the common user interface, in accordance with the techniques described in this disclosure. In the example of FIG. 6, the topology relationship information may include the device role (e.g., core device or access device), network device identifier, MAC address of the network device, model, site, port role (e.g., uplink/downlink to core network, ESI-LAG), and port of a first endpoint of a connection, and the device role (e.g., core device or access device), network device identifier, MAC address of the network device, model, site, port role (e.g., uplink/downlink to core network, ESI-LAG), and port of a second endpoint of the connection. As described above, NMS 200 may push topology relationship information (e.g., one or more API resources) to send a controller or orchestrator to generate configuration information for each of the network devices based on the topology relationship information to establish the EVPN topology.

Figure 7:
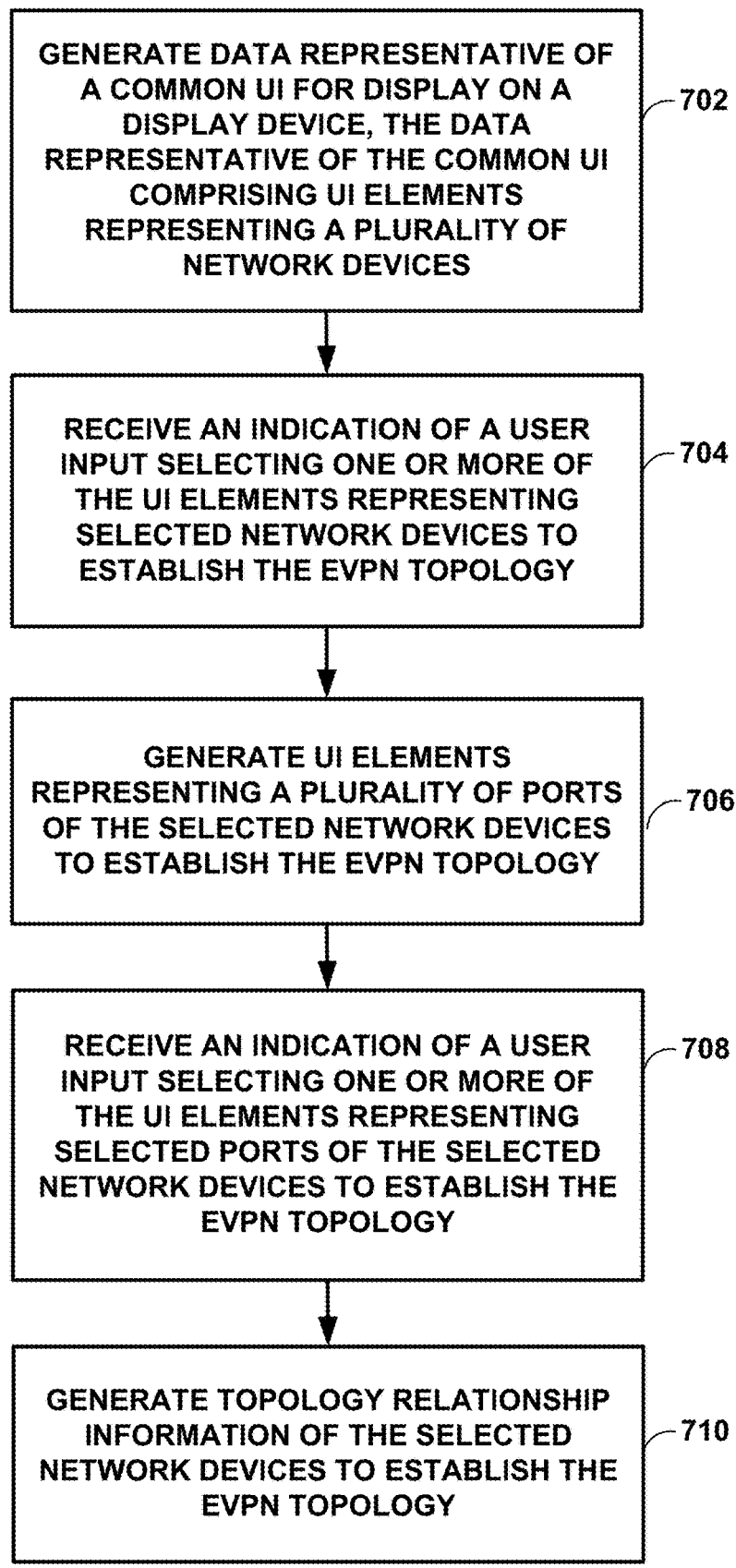
FIG. 7 is a flowchart of an example process by which a network management system provides a common user interface to enable a user to collectively configure network devices to establish an EVPN topology, in accordance with one or more techniques of the disclosure.

FIG. 7 is a flowchart of an example process by which a network management system provides a common user interface to enable a user to collectively configure network devices to establish an EVPN topology, in accordance with one or more techniques of the disclosure. FIG. 7 is described with respect to NMS 130 of FIG. 1A, NMS 130 of FIG. 1B, and/or EVPN topology configuration engine 270 of FIGS. 2A, 2B.

For example, NMS 130 may generate data representative of a common user interface for display on a display device, the data representative of the common user interface comprising user interface elements representing a plurality of network devices to be configured in an EVPN multihoming topology (702). NMS 130 may receive, via the common user interface on the display device, an indication of a user input selecting one or more of the UI elements representing selected network devices to establish the EVPN topology (704). NMS 130 may generate UI elements representing a plurality of ports of the selected network devices to establish the EVPN topology (706). NMS 130 may receive, via the common user interface on the display device, an indication of a user input selecting one or more of the UI elements representing selected ports of the selected network devices for configuration of the EVPN topology (708). In response to the selection of ports for the selected network devices to establish the EVPN topology, EVPN topology configuration engine 270 generates topology relationship information of the selected network devices to establish the EVPN topology (710).

The following example process is described with respect to the example of establishing an EVPN multihoming topology as described in FIG. 1A and FIGS. 4A-4M. In this example, NMS 130 may generate (or cause a user interface module, e.g., UI module 271 of FIG. 2B to generate) data representative of common UI 400 of FIG. 4A including UI elements representing a selection to establish an EVPN multihoming topology. In response to receiving, via common user interface 400 on the display device, an indication of a user input selecting the UI element representing the selection to establish an EVPN multihoming topology, NMS 130 may generate data representative of common user interface 400 of FIG. 4A including UI elements representing various network settings (e.g., topology scope, overlay and underlay settings). In response to receiving, via common user interface 400 on the display device, an indication of a user input selecting the UI element representing the selection to establish an EVPN multihoming topology and various network settings for the EVPN multihoming topology, NMS 130 may generate common user interface 410 of FIG. 4B including selectable user interface elements representing a plurality of network devices to be configured in an EVPN multihoming topology (702). For example, common user interface 410 of FIG. 4B includes selectable user interface elements 412 for selecting which core devices and selectable user interface element 414 for selecting which access devices to configure and establish the EVPN multihoming topology. In response to receiving an indication of a user input selecting UI element 412 or user interface element 414, NMS 130 may generate data representative of common UI 420 of FIG. 4C including UI elements (e.g., UI elements 424A-424F) representing selected network devices to be established for the EVPN multihoming topology.

In some examples, NMS 130 may generate data representative of a common user interface 450 of FIG. 4F including user interface elements representing various network configurations, such as VLANs 451 to add one or more VLANs for use in the EVPN multihoming topology, network specific configurations 452 (illustrated as "Other IP Configuration") to specify IP configurations (e.g., DHCP and/or Static IP configurations), VRFs 453 to add VRFs to the EVPN multihoming topology, aggregated Ethernet indexes 454 to specify a list or range of indexes for aggregated Ethernet interfaces, and port configurations 455 to specify the mode (e.g., trunk or access), VLANs for a trunk network, speed, duplex, MAC limit, or other configurations of the ports of the network devices.

In response to receiving an indication of a user input selecting one or more of the UI elements representing selected network devices to establish the EVPN multihoming topology (704), NMS 130 may generate within common user interface 480 of FIG. 4I UI elements representing a plurality of ports of the selected network devices to establish the EVPN multihoming topology (706). For example, common UI 480 includes UI elements 481 representing a plurality of ports of the selected core device. NMS 130 may receive, via common user interface 480 of FIG. 4I on the display device, an indication of a user input selecting one or more of the UI elements representing selected ports of the selected network devices for configuration of the EVPN multihoming topology (708). For example, the user input may be a selection of UI element 482 representing a selected port of the selected core device to establish the EVPN multihoming topology.

In response to the selection of ports for the selected network devices to establish the EVPN topology, NMS 130 generates topology relationship information of the selected network devices to establish the EVPN multihoming topology (710). For example, NMS 130 may execute API requests (e.g., PUT or POST requests) to update or create one or more API resources (e.g., topology relationship information) with the information specified by the user input to the common user interface and send the topology relationship information to a controller or orchestrator to generate configuration information for each of the selected network devices to establish the EVPN multihoming topology.

The following example process is described with respect to the example of establishing an IP-CLOS topology as described in FIG. 1B and FIGS. 5A-5F. In this example, NMS 130 may generate (or cause a user interface module, e.g., UI module 271 of FIG. 2B to generate) data representative of common UI 500 of FIG. 5A including UI elements representing a selection to establish an IP-CLOS topology. In response to receiving, via common user interface 500 on the display device, an indication of a user input selecting the UI element representing the selection to establish an IP-CLOS topology, NMS 130 may generate data representative of common user interface 500 of FIG. 5A including UI elements representing various network settings (e.g., topology name, overlay and underlay settings). In response to receiving, via common user interface 500 on the display device, an indication of a user input selecting the UI element representing the selection to establish an IP-CLOS topology and the various network settings for the IP-CLOS topology, NMS 130 may generate common user interface 510 of FIG. 5B including selectable user interface elements representing a plurality of network devices to be configured in an IP-CLOS topology (702). For example, common user interface 510 of FIG. 5B includes selectable user interface element 512 for selecting core devices, selectable user interface element 514 for selecting distribution devices, and selectable user interface element 516 for selecting access devices to configure and establish the IP-CLOS topology. In some examples, NMS 130 may generate data representative of a common user interface 520 of FIG. 5C including user interface elements representing various network configurations, such as VLANs 522 to add one or more VLANs for use in the IP-CLOS topology, network specific configurations 524 (illustrated as "Other IP Configuration") to specify IP configurations (e.g., DHCP and/or Static IP configurations), VRFs 526 to add VRFs to the EVPN multihoming topology, or other configurations for the IP-CLOS topology.

In response to receiving an indication of a user input selecting one or more of the UI elements representing selected network devices to establish the IP-CLOS topology (704), NMS 130 may generate within common user interface 540 of FIGS. 5E-1 and 5E2 UI elements representing a plurality of ports of the selected network devices to establish the IP-CLOS topology (706). For example, common UI 520 includes UI elements 542 representing a plurality of ports of the selected core device, UI elements 544 representing a plurality of ports of the selected distribution device, and UI elements 547 representing a plurality of ports of the selected access device. NMS 130 may receive, via common user interface 520 of FIG. 5F on the display device, an indication of a user input selecting one or more of the UI elements representing selected ports of the selected network devices for configuration of the IP-CLOS topology (708). For example, the user input may be a selection of UI element 545 representing a selected port of the selected distribution device to establish the IP-CLOS topology.

In response to the selection of ports for the selected network devices to establish the IP-CLOS topology, NMS 130 generates topology relationship information of the selected network devices to establish the IP-CLOS topology (710). For example, NMS 130 may execute API requests (e.g., PUT or POST requests) to update or create one or more API resources (e.g., topology relationship information) with the information specified by the user input to the common user interface and send the topology relationship information to a controller or orchestrator to generate configuration information for each of the selected network devices to establish the IP-CLOS topology.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—

Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHZ)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 200 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/ lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4200, FX-6200, and FX-8250 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA.® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing the configuration and establishment of an EVPN topology using a common user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A network management system comprising:
   one or more processors; and
   a memory comprising instructions that when executed by the one or more processors cause the one or more processors to:
   generate data to output for display, the data representative of user interface (UI) elements representing one or more types of network topologies configured to extend a first layer network through a second layer network and representing one or more connections of one or more network devices to be configured in a network topology of the one or more types of network topologies;
   receive an indication of at least one selected connection of the one or more network devices and of a selected type of network topology; and
   generate, based on the at least one selected connection of the one or more network devices and the selected type of network topology, topology relationship information of the one or more network devices to establish the network topology.

2. The network management system of claim 1, wherein the one or more types of network topologies comprise at least one of an Ethernet Virtual Private Network (EVPN) multihoming topology or an IP-CLOS topology.

3. The network management system of claim 1, wherein to generate data to output for display, the one or more processors are further configured to:
   obtain information of the one or more network devices via an application programming interface (API).

4. The network management system of claim 1, wherein to generate the topology relationship information, the one or more processors are further configured to:
   execute an application programming interface (API) request to create or update one or more API resources specifying the topology relationship information.

5. The network management system of claim 4, wherein the one or more API resources specifying the topology relationship information comprise at least one of an API resource specifying one or more network settings of the network topology, an API resource specifying configuration information for the at least one selected connection of the one or more network devices, or an API resource specifying topology relationship information of each of the one or more network devices of the network topology.

6. The network management system of claim 1, wherein the topology relationship information is used to generate configuration information for each of the one or more network devices to establish the network topology.

7. The network management system of claim 1, wherein to generate topology relationship information, the one or more processors are further configured to:
   generate an Ethernet segment identifier link aggregation group (ESI-LAG) for the at least one selected connection of the one or more network devices.

8. The network management system of claim 1, wherein to generate topology relationship information, the one or more processors are further configured to:
   generate an IP address for one or more VLANs for the network topology.

9. The network management system of claim 1, wherein the one or more processors are further configured to:
   validate whether the at least one selected connection of the one or more network devices is usable to establish the network topology.

10. A method comprising:
    generating, by one or more processors of a network management system, data to output for display, the data representative of user interface (UI) elements representing one or more types of network topologies configured to extend a first layer network through a second layer network and representing one or more connections of one or more network devices to be configured in a network topology of the one or more types of network topologies;
    receiving an indication of at least one selected connection of the one or more network devices and of a selected type of network topology; and
    generating, by the network management system, based on the at least one selected connection of the one or more network devices and the selected type of network topology, topology relationship information of the one or more network devices to establish the network topology.

11. The method of claim 10, wherein the one or more types of network topologies comprise at least one of an Ethernet Virtual Private Network (EVPN) multihoming topology or an IP-CLOS topology.

12. The method of claim 10, wherein generating data to output for display comprises:
obtaining, by the network management system, information of the one or more network devices via an application programming interface (API).

13. The method of claim 10, wherein generating the topology relationship information comprises:
executing, by the network management system, an application programming interface (API) request to create or update one or more API resources specifying the topology relationship information.

14. The method of claim 13, wherein the one or more API resources specifying the topology relationship information comprises at least one of an API resource specifying one or more network settings of the network topology, an API resource specifying configuration information for the at least one selected connection of the one or more network devices, or an API resource specifying topology relationship information of each of the one or more network devices of the network topology.

15. The method of claim 10, wherein the topology relationship information is used to generate configuration information for each of the one or more network devices to establish the network topology.

16. The method of claim 10, wherein generating topology relationship information comprises:
generating an Ethernet segment identifier link aggregation group (ESI-LAG) for the at least one selected connection of the one or more network devices.

17. The method of claim 10, wherein generating topology relationship information comprises:
generating an IP address for one or more VLANs for the network topology.

18. The method of claim 10, further comprising:
validating, by the network management system, whether the at least one selected connection of the one or more network devices is usable to establish the network topology.

19. Non-transitory computer-readable storage media comprising instructions that, when executed, configure processing circuitry to:
generate data to output for display, the data representative of user interface (UI) elements representing one or more types of network topologies configured to extend a first layer network through a second layer network and representing one or more connections of one or more network devices to be configured in a network topology of the one or more types of network topologies;
receive an indication of at least one selected connection of the one or more network devices and of a selected type of network topology; and
generate, based on the at least one selected connection of the one or more network devices and the selected type of network topology, topology relationship information of the one or more network devices to establish the network topology.

\* \* \* \* \*